US010176596B1

(12) United States Patent
Mou

(10) Patent No.: US 10,176,596 B1
(45) Date of Patent: Jan. 8, 2019

(54) CALIBRATION VERIFICATION METHODS FOR AUTONOMOUS VEHICLE OPERATIONS

(71) Applicant: GM GLOBAL TECHNOLOGY OPERATIONS LLC, Detroit, MI (US)

(72) Inventor: Wei Mou, South San Francisco, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/642,932

(22) Filed: Jul. 6, 2017

(51) Int. Cl.
   *G06T 7/80* (2017.01)
   *G08G 1/16* (2006.01)
   *G05D 1/02* (2006.01)
   *G06T 7/13* (2017.01)

(52) U.S. Cl.
   CPC .............. *G06T 7/80* (2017.01); *G05D 1/0238* (2013.01); *G06T 7/13* (2017.01); *G08G 1/16* (2013.01); *B60Y 2400/301* (2013.01); *G06T 2207/10028* (2013.01)

(58) Field of Classification Search
   CPC ... G06T 7/80; G06T 7/13; G06T 2207/10028; G05D 1/0238; G08G 1/16; B60Y 2400/301
   See application file for complete search history.

(56) References Cited

U.S. PATENT DOCUMENTS

| 8,812,226 B2* | 8/2014 | Zeng | G01S 13/723 |
| | | | 382/103 |
| 9,069,080 B2* | 6/2015 | Stettner | G01S 17/023 |
| 9,916,703 B2* | 3/2018 | Levinson | B60Q 1/26 |
| 2017/0223346 A1* | 8/2017 | Derenick | B64C 39/024 |

OTHER PUBLICATIONS

Jesse Levinson, Sebastian Thrun, Automatic Online Calibration of Cameras and Lasers, Stanford Artificial Intelligence Laboratory, 2013.

* cited by examiner

*Primary Examiner* — Shefali D Goradia
(74) *Attorney, Agent, or Firm* — Lorenz & Kopf, LLP

(57) ABSTRACT

Systems and method are provided for controlling a vehicle. In one embodiment, a vehicle includes a camera onboard the vehicle, a lidar device onboard the vehicle, a data storage element onboard the vehicle maintaining one or more transformation parameter values associated with a pairing of the camera and the lidar device, one or more sensors onboard the vehicle, and a controller. The controller detects a stationary condition based on output of the one or more sensors, obtains a first set of image data from the camera during the stationary condition, filters horizontal edge regions from the first set, obtains a second set of the ranging data during the stationary condition, and validates the one or more transformation parameter values based on a relationship between the filtered set of the image data and the second set of the ranging data.

20 Claims, 12 Drawing Sheets

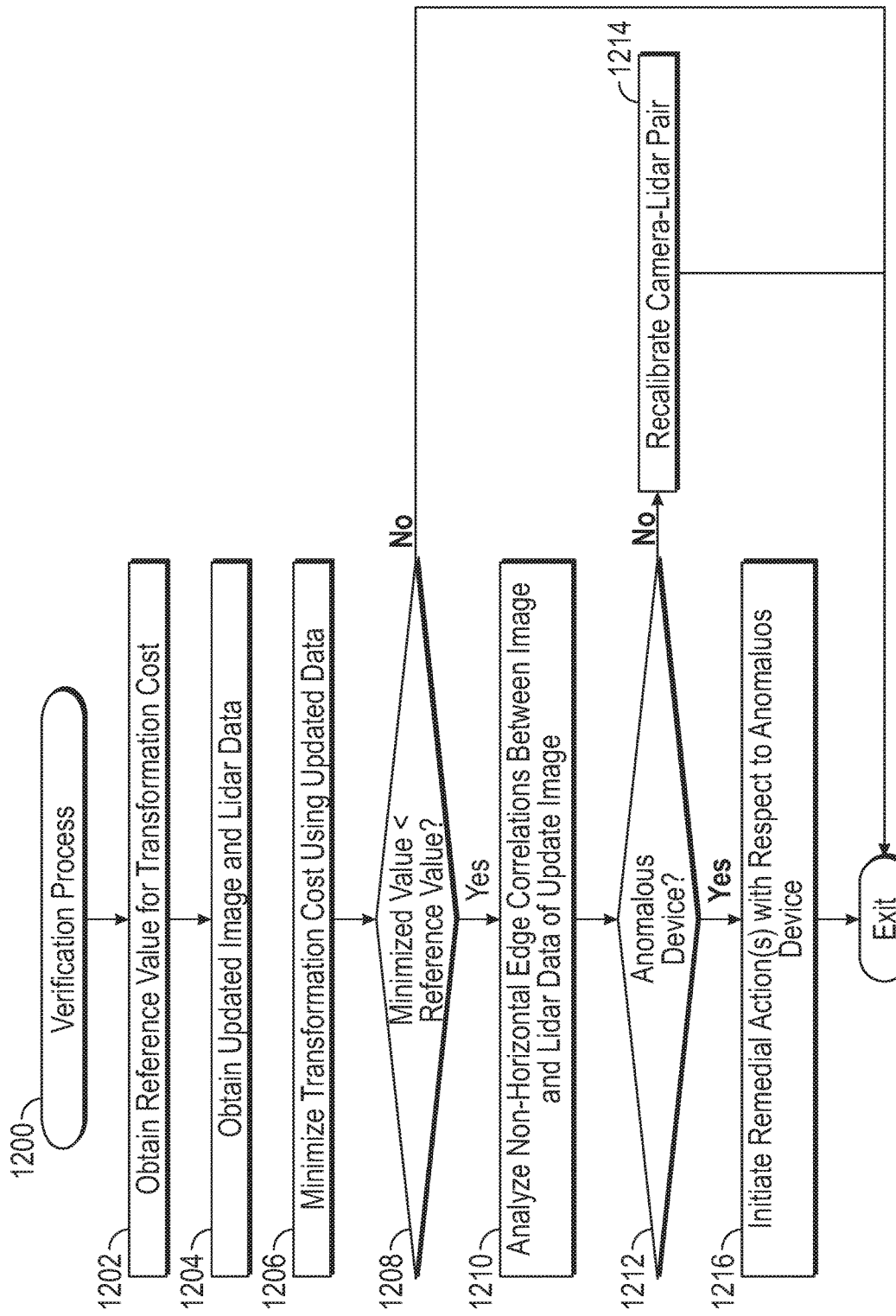

CALIBRATION VERIFICATION METHODS FOR AUTONOMOUS VEHICLE OPERATIONS

CROSS-REFERENCE TO RELATED APPLICATIONS

The subject matter described here is related to the subject matter described in U.S. patent application Ser. No. 15/642,876, filed concurrently herewith.

TECHNICAL FIELD

The present disclosure generally relates to automotive vehicles, and more particularly relates to systems and methods for autonomous controls of onboard components using calibrated relationships between different types of data representative of the operating environment.

BACKGROUND

An autonomous vehicle is a vehicle that is capable of sensing its environment and navigating with little or no user input. An autonomous vehicle senses its environment using sensing devices such as radar, lidar, image sensors, and the like. The autonomous vehicle system further uses information from global positioning systems (GPS) technology, navigation systems, vehicle-to-vehicle communication, vehicle-to-infrastructure technology, and/or drive-by-wire systems to navigate the vehicle.

Vehicle automation has been categorized into numerical levels ranging from Zero, corresponding to no automation with full human control, to Five, corresponding to full automation with no human control. Various automated driver-assistance systems, such as cruise control, adaptive cruise control, and parking assistance systems correspond to lower automation levels, while true "driverless" vehicles correspond to higher automation levels.

To achieve high level automation, vehicles are often equipped with an increasing number of different types of devices for analyzing the environment around the vehicle, such as, for example, cameras or other imaging devices capturing imagery of the environment, radar or other ranging devices for surveying or detecting features within the environment, and the like. In practice, the different onboard devices are located at different locations onboard the vehicle and typically operate at different sampling rates or refresh rates, and as a result, capture different types of data corresponding to different points in time from different viewpoints or perspectives. Accordingly, it is desirable to provide systems and methods for calibrating relationships between different devices to improve the ability to accurately establish correlations between different types of data, which, in turn facilitates gleaning more accurate information about the environment from the data and/or assigning attributes to objects or features within the environment more accurately, thereby improving autonomous vehicle controls. Furthermore, it is desirable to also recognize potential anomalous conditions that may influence calibration and undertake appropriate remedial action(s) to mitigate potential degradation of the calibration. Other desirable features and characteristics of the present invention will become apparent from the subsequent detailed description and the appended claims, taken in conjunction with the accompanying drawings and the foregoing technical field and background.

SUMMARY

Systems and method are provided for controlling a vehicle. In one embodiment, a method includes: detecting a stationary condition of the vehicle based on output of a sensor system onboard the vehicle, in response to the stationary condition obtaining a first image from an imaging device onboard the vehicle and a first set of ranging data corresponding to a field of view of the imaging device from a ranging device onboard the vehicle during the stationary condition, correlating first edge regions from the first image with second edge regions of the first set of ranging data, detecting an anomalous condition exists based on a relationship between the correlated first and second edge regions relative to a reference relationship associated with the one or more transformation parameter values, and initiating one or more remedial actions with respect to the anomalous condition.

In another embodiment, an autonomous vehicle is provided, which includes: a first device onboard the vehicle providing first data, a second device onboard the vehicle providing second data, a data storage element onboard the vehicle maintaining one or more transformation parameter values associated with a pairing of the first device and the second device, one or more sensors onboard the vehicle, and a controller that, by a processor, detects a stationary condition based on output of the one or more sensors, obtains a first set of the first data from the first device during the stationary condition, filters horizontal edge regions from the first set resulting in a filtered set of the first data, obtains a second set of the second data during the stationary condition, and validates the one or more transformation parameter values based on a relationship between the filtered set of the first data and the second set of the second data.

In another embodiment, a method of controlling a vehicle includes: detecting a stationary condition of the vehicle based on output of a sensor system onboard the vehicle, in response to the stationary condition obtaining an image from an imaging device onboard the vehicle and a set of ranging data corresponding to a field of view of the imaging device from a ranging device onboard the vehicle during the stationary condition, filtering horizontal edges from the image, identifying non-horizontal edge regions in the set of ranging data, and determining a minimum transformation cost based on a relationship between non-horizontal edge regions of the filtered image and the non-horizontal edge regions in the set of ranging data. When the minimum transformation cost is greater than a reference transformation cost associated one or more calibrated transformation parameter values for transforming between a reference frame associated with the imaging device and a reference frame associated with the ranging device, the method continues by determining whether an anomalous condition exists with respect to one of the imaging device and the ranging device based on the relationship between the non-horizontal edge regions of the filtered image and the second non-horizontal edge regions in the set of ranging data, and in response to an anomalous condition, initiating a remedial action with respect to the one of the imaging device and the ranging device.

DESCRIPTION OF THE DRAWINGS

The exemplary embodiments will hereinafter be described in conjunction with the following drawing figures, wherein like numerals denote like elements, and wherein:

FIG. 12 is a flowchart illustrating a calibration verification process for validating existing calibration of a pair of devices and detecting anomalous conditions with respect to one of the devices in accordance with one or more exemplary embodiments.

DETAILED DESCRIPTION

Figure 1:
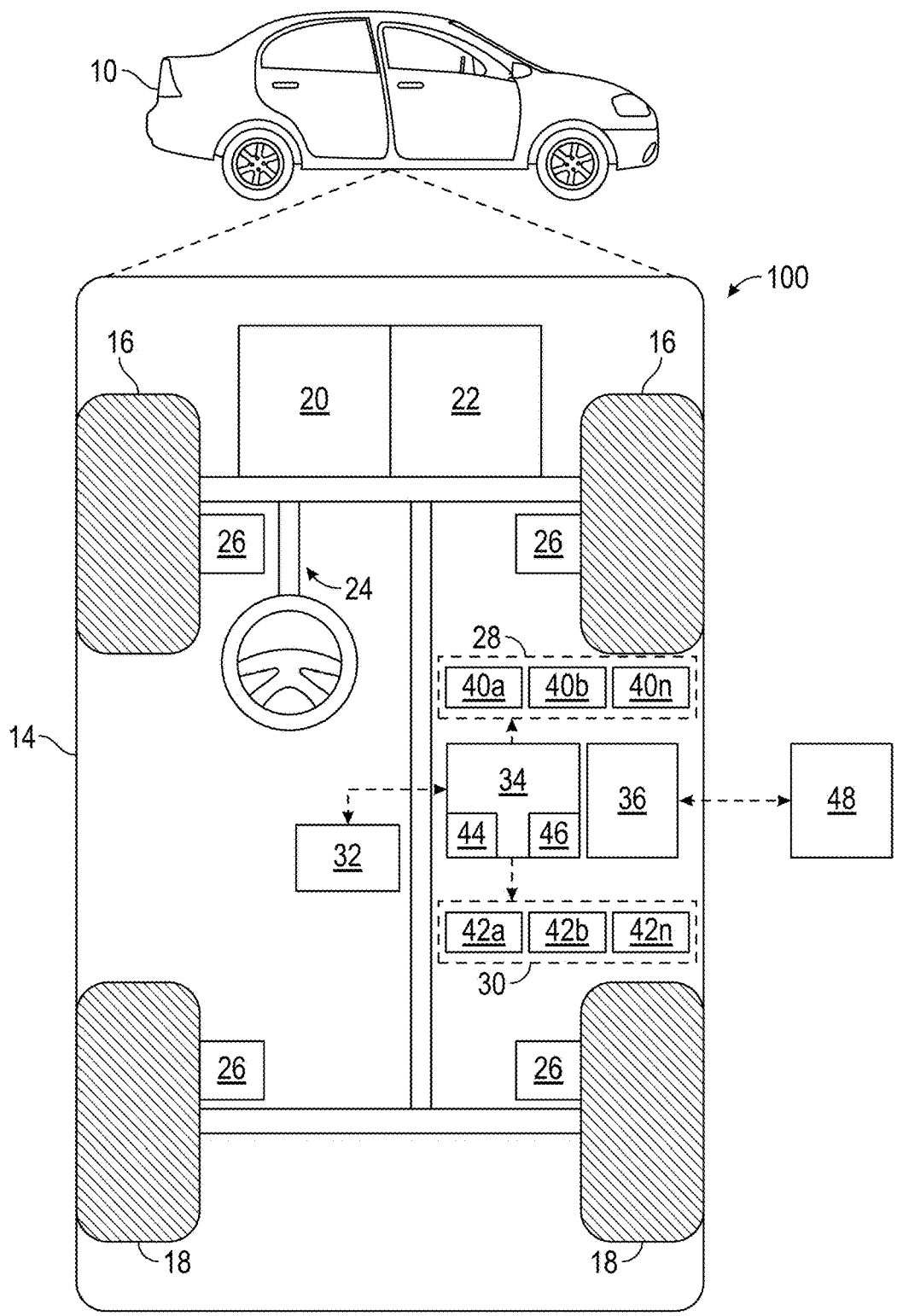
FIG. 1 is a functional block diagram illustrating an autonomous vehicle in accordance with various embodiments.

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, imaging, ranging, synchronization, calibration, control systems, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

In one or more exemplary embodiments described herein, a vehicle capable of some level of autonomous operation includes a number of different devices that capture images or otherwise generate data representative of a scene or environment in a vicinity of the vehicle from different perspectives and with different sampling or refresh rates. Image data from one onboard imaging device may be correlated with ranging data from a ranging device onboard the vehicle based on the relationship between the line-of-sight and/or field of view of the imaging device and instances in time during which the ranging device is surveying or scanning the field of view associated with the imaging device. In exemplary embodiments, the relationship between a particular imaging device and a particular ranging device is calibrated to obtain conversion parameter values that may be used to translate ranging data from the ranging device to an image captured by the imaging device, and vice versa. For example, coordinate locations or positions may be assigned to portions of the image using the ranging data and the conversion parameter values to translate coordinates or points within the ranging data reference frame to the image data reference frame. In this manner, relative depths or other dimensional or physical attributes may be assigned to regions within the image, which, in turn, may be utilized to detect or otherwise recognize particular types of objects within the image, calculate or determine distances between the objects and the vehicle, and determine commands for steering or otherwise operating the vehicle in a manner that is influenced by the type and relative position of the objects in the vehicle environment. For purposes of explanation, the subject matter may be described herein primarily in the context of the imaging devices being realized as cameras and the ranging devices being realized as light detection and ranging (lidar) devices. That said, it should be appreciated that the subject matter described herein is not necessarily limited to use with optical cameras and lidars, and alternative embodiments may employ other types of cameras or imaging devices, radar or other types of ranging devices or sensing arrangements (e.g., sonar, light pattern sensors, parallax algorithms, etc.), or any number of combinations of imaging devices and ranging devices.

As described in greater detail below primarily in the context of FIGS. 4-11, in exemplary embodiments, a camera is calibrated with a lidar by obtaining or otherwise selecting data generated or otherwise output by each of the devices during a period of time when the vehicle is stationary. In this regard, a stationary condition of the vehicle may be detected or otherwise identified prior to the calibration data collection process is performed. An image captured by the camera while the vehicle is stationary is obtained, and a set of ranging data output by the lidar while the vehicle is stationary is also obtained, where the set of ranging data corresponds to the field of view of the camera. In one or more exemplary embodiments, where the camera captures multiple images during the stationary condition, the image captured closest in time to when the lidar scans the camera's field of view is utilized for the calibration.

Once an image and corresponding ranging data are obtained, the image data is processed or otherwise analyzed to detect or otherwise identify horizontal edges within the image. For example one or more image processing techniques may be performed on the image data to identify edges within the image, which are filtered to generally exclude or otherwise remove from further consideration any edges which are substantially horizontal, which manifest themselves as discontinuities or changes in image characteristics when moving vertically along a vertical scan line or column of pixels from one row of pixels to another. In one exemplary embodiment, Gaussian smoothing is performed on the image data to reduce noise, and then a Sobel kernel is applied to quantify the magnitude of difference or discontinuity between pixels in terms of image intensity. In this regard, the Sobel kernel is configured to preferentially quantify or capture intensity changes along rows of pixels as well as quantifying or capturing intensity changes in diagonal directions (albeit with reduced weighting), while substantially filtering out intensity changes along columns of pixels. In this regard, the Sobel kernel function filters horizontal edges (e.g., discontinuities along a vertical scan line or column of pixels) while isolating, emphasizing or otherwise identifying only those edges within the image that are substantially vertical or diagonally aligned with respect to a horizontal reference plane of the image (e.g., discontinuities along a horizontal row of pixels or diagonally from one pixel to another).

The non-horizontal edge regions are selected or otherwise retained for correlating with ranging data corresponding to those edge regions. In this regard, using the location of the edge regions within the image, the locations of corresponding regions within the ranging data may be determined or otherwise identified based on the relationship between the field of view of the camera and the orientations of the lidar at which ranging data for the field of view are obtained. In general, a non-horizontal edge region in an image manifests itself as changes in intensity or another characteristic of the image when moving horizontally from one pixel left or right to another pixel across a substantially horizontal row of pixels or when moving diagonally from one pixel to another, while a non-horizontal edge in the ranging data manifests itself as changes in depth or distance when moving horizontally from one point to another point across a row of points within the lidar point cloud dataset.

After identifying subsets of ranging data corresponding to the edge region subsets of imaging data, the non-horizontal edge region subsets of imaging data and non-horizontal edge region subsets of ranging data may be stored or otherwise maintained and then utilized for calibrating the relationship between images captured by that camera and lidar scans of that camera's field of view. For example, translational and rotational conversion parameter values for transforming ranging data to the image reference frame and vice versa may be determined by solving for parameter values that minimize a cost function associated with the transformation. Thereafter, for a subsequent set of ranging data generated by the lidar for the camera field of view, the conversion parameter values may be utilized to transform the lidar points from the lidar reference frame to the image reference frame. Once the lidar points are transformed to the image reference frame, the lidar points may be projected into image pixel locations using the camera's intrinsic parameters (e.g., focal length, principal point, and distortion parameters, and the like), thereby allowing depths or other physical or dimensional attributes to be assigned to image pixel locations (or regions or sets thereof). In this regard, object detection, classification, and analysis based on the image data may be improved using depth, distance, dimensions, or other information derived from the calibrated and correlated lidar data, which, in turn, also improves autonomous operation of the vehicle by virtue of the commands for operating the vehicle being influenced by those objects in the environment in the vicinity of the vehicle. For example, by more accurately correlating pixels of image data with projected lidar points, a more accurate bounding box of an object in the image can be determined, which, in turn, improves object classification when applying a neural network to the image data contained within the bounding box to determine what the object is (e.g., a car, a pedestrian, a traffic sign, etc.).

In some embodiments, multiple pairs of images and corresponding sets of ranging data are utilized to calibrate a camera-lidar pair. For example, after an initial set of non-horizontal edge region subsets of imaging data and ranging data have been obtained for an initial vehicle pose, the vehicle may be driven or otherwise moved until a subsequent stationary condition is detected. Once the stationary condition is detected, an updated set of ranging data captured by the lidar while scanning the camera's field of view while the vehicle is stationary is obtained and paired with an updated image captured by the camera while the vehicle is stationary proximate the time the lidar scanned the camera's field of view. Again, non-horizontal edge regions of image data in the updated image are identified and associated with corresponding non-horizontal edge regions of the updated ranging data. The paired non-horizontal edge regions of updated data may similarly be stored or otherwise maintained and utilized for calibrating the camera-lidar pair, for example, by minimizing the cost function considering both the association between the initially paired non-horizontal edge region data from the initial vehicle pose and the association between the updated pairing of non-horizontal edge region data from the updated vehicle pose.

Additionally, in some embodiments, the paired non-horizontal edge region data may be stored or otherwise be maintained in association with the vehicle pose at which the corresponding image and ranging data were obtained, thereby accounting for changes in the vehicle pose between paired camera-lidar data sets. For example, in some embodiments, a minimum threshold difference between vehicle poses associated with the camera-lidar data sets to ensure that the underlying data of the camera-lidar data sets is sufficiently dissimilar (e.g., to avoid using substantially redundant data in the calibration). In yet other embodiments, the cost function may account for the relative vehicle pose differences between paired camera-lidar data sets, for example, to improve the accuracy of the calibration where portions of the images overlap or capture a common object or area, or the like. For example, when substantially the same scene or environment around the vehicle is captured from different vehicle positions or orientations (e.g., when the difference in vehicle pose between paired camera-lidar data sets is less than the minimum threshold difference), the calibration may be improved by incorporating or otherwise accounting for the vehicle pose and corresponding positions and orientations of the camera and lidar into the cost function.

Filtering out horizontal edges and limiting calibration to substantially non-horizontal edge regions of image and ranging data reduces the effects of noise in the ranging data and may also reduce the computational resources and time required for calibrating a camera-lidar pair. In this regard, multiple camera-lidar pairs may be calibrated substantially concurrently. For example, when the vehicle includes multiple different cameras having different field of views is stationary for a duration of time sufficient for the lidar to scan a complete revolution around the vehicle, each of the cameras may be calibrated with the lidar in a similar manner as described above for each camera (e.g., by correlating non-horizontal edge regions of an image captured by the respective camera while the vehicle is stationary with corresponding regions in the portion of the ranging data corresponding to the lidar scanning the respective camera's field of view). By filtering out horizontal edges, the calibration can be performed more quickly and with less susceptibility to noise, thereby allowing multiple cameras to be calibrated with respect to a lidar device on-the-fly. For example, in one embodiment, each time the vehicle is started, the onboard cameras may be initially calibrated with the lidar device while the vehicle is initially in the stationary position, and then the calibrations may be subsequently updated upon the next stationary condition of the vehicle. Thus, calibrations for multiple cameras with respect to a given lidar device may be regularly updated and without requiring any special calibration procedures or maneuvers being performed.

As described in greater detail below primarily in the context of FIG. 12, in exemplary embodiments described herein, the continued validity or accuracy of the existing calibration of each particular camera-lidar pair may be periodically verified during autonomous operation of the vehicle to detect or otherwise identify an anomalous condition with respect to one of the camera or the lidar and taking one or more remedial actions to mitigate the anomalous condition. For example, the cost function and conversion parameter values associated with a camera-lidar pair may be reevaluated using a most recently obtained pairing of image and ranging data to verify that the conversion parameter values from the preceding calibration minimize the cost function. In response to determining that the conversion parameter values no longer minimize the cost function, edges within that recent pairing of image and ranging data are analyzed to identify or otherwise determine whether an anomalous condition exists with respect to one of the devices. For example, non-horizontal edges may be identified within the image, and then the presence of corresponding non-horizontal edges may be verified or confirmed as being present in the lidar point cloud data. Conversely, non-horizontal edges may be identified within the lidar point cloud data, and then the presence of corresponding non-horizontal edges may be verified or confirmed as being present in the image data. It should be noted however that the calibration verification processes described herein are not necessarily limited to discontinuities, and in practice, may utilize other types of alignment algorithms or correlations that do not necessarily rely on horizontal discontinuities.

In response to the absence of a non-horizontal edge region in the image data that corresponds to a non-horizontal edge region in the lidar point cloud data, that camera may be flagged or otherwise indicated as potentially exhibiting an anomalous condition. For example, a user notification may be generated or otherwise provided to notify a vehicle operator, owner, or passenger of a potential anomalous condition with respect to the camera. Thereafter, manual inspection or maintenance of the camera could be performed to restore operation of the camera (e.g., cleaning the lens, securing electrical connections, or the like). Additionally, one or more additional remedial actions may also be performed, such as, for example, temporarily suspending use of the camera or deemphasizing or reducing the influence of the image data from that camera relative to others (e.g., by adjusting one or more weighting factors in an algorithm). Similarly, in response to the absence of a non-horizontal edge region in the lidar data that corresponds to a non-horizontal edge region in the image data, the lidar may be flagged or otherwise indicated as potentially exhibiting an anomalous condition, and one or more additional remedial actions may also be performed (e.g., temporarily suspending use of that lidar when other lidar or radar are available onboard the vehicle).

Referring now to FIG. 1, in accordance with one or more embodiments, an autonomous vehicle control system shown generally at 100 is associated with a vehicle 10. In general, the control system 100 determines a motion plan for autonomously operating the vehicle 10 along a route in a manner that accounts for objects or obstacles detected by onboard sensors 28, 40, as described in greater detail below. As described above and in greater detail below, a control module onboard the autonomous vehicle 10 calibrates different types of onboard sensors 28, 40 with respect to one another, thereby allowing data from those different types of onboard sensors 28, 40 to be spatially associated or otherwise with one another based on the calibration, thereby improving object detection, object classification, and the resulting autonomous operation of the vehicle 10.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the vehicle 10 is an autonomous vehicle and the control system 100 is incorporated into the autonomous vehicle 10 (hereinafter referred to as the autonomous vehicle 10). The autonomous vehicle 10 is, for example, a vehicle that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. In an exemplary embodiment, the autonomous vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the autonomous vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16-18. The brake system 26 may, in various embodiments, include friction brakes, brake by wire, a regenerative braking system such as an electric machine, and/or other appropriate braking systems. The steering system 24 influences a position of the of the vehicle wheels 16-18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras, thermal cameras, ultrasonic sensors, and/or other sensors. The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

The data storage device 32 stores data for use in automatically controlling the autonomous vehicle 10. In various embodiments, the data storage device 32 stores defined maps of the navigable environment. In various embodiments, the defined maps may be predefined by and obtained from a remote system (described in further detail with regard to FIG. 2). For example, the defined maps may be assembled by the remote system and communicated to the autonomous vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down.

The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms. Although only one controller 34 is shown in FIG. 1, embodiments of the autonomous vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

In various embodiments, one or more instructions of the controller 34 are embodied in the control system 100 (e.g., in data storage element 46) and, when executed by the processor 44, cause the processor 44 to detect or identify a stationary condition of the vehicle 10 based on the output data from one or more vehicle sensors 40 (e.g., a speed sensor, a positioning sensor, or the like), obtain data captured or generated from imaging and ranging devices 40 while the vehicle 10 is stationary, and calibrate relationships between respective imaging device 40 and respective ranging devices 40 using non-horizontal edges, as described in greater detail below. Thereafter, the processor 44 may utilize the calibrations to establish correlations and transformation between the data sets to assign attributes from one data set to another data set, and thereby improve object detection, object classification, object prediction, and the like. The resulting objects and their classification and predicted behavior influences the travel plans for autonomously operating the vehicle 10, which, in turn, influences commands generated or otherwise provided by the processor 44 to control actuators 42.

Additionally, in one or more embodiments, the processor 44 detects or identifies a stationary condition of the vehicle 10 and periodically verifies or validates the accuracy of the existing calibrations, and in response to an anomalous condition with respect to a calibration, the processor 44 determines whether the imaging device 40 or the ranging device 40 is exhibiting an anomalous condition using non-horizontal edges. Absent an anomalous condition with respect to either the imaging device 40 or the ranging device 40, the processor 44 may recalibrate the pair and resume the aforementioned operation of the vehicle 10 using the updated calibration.

Figure 2:
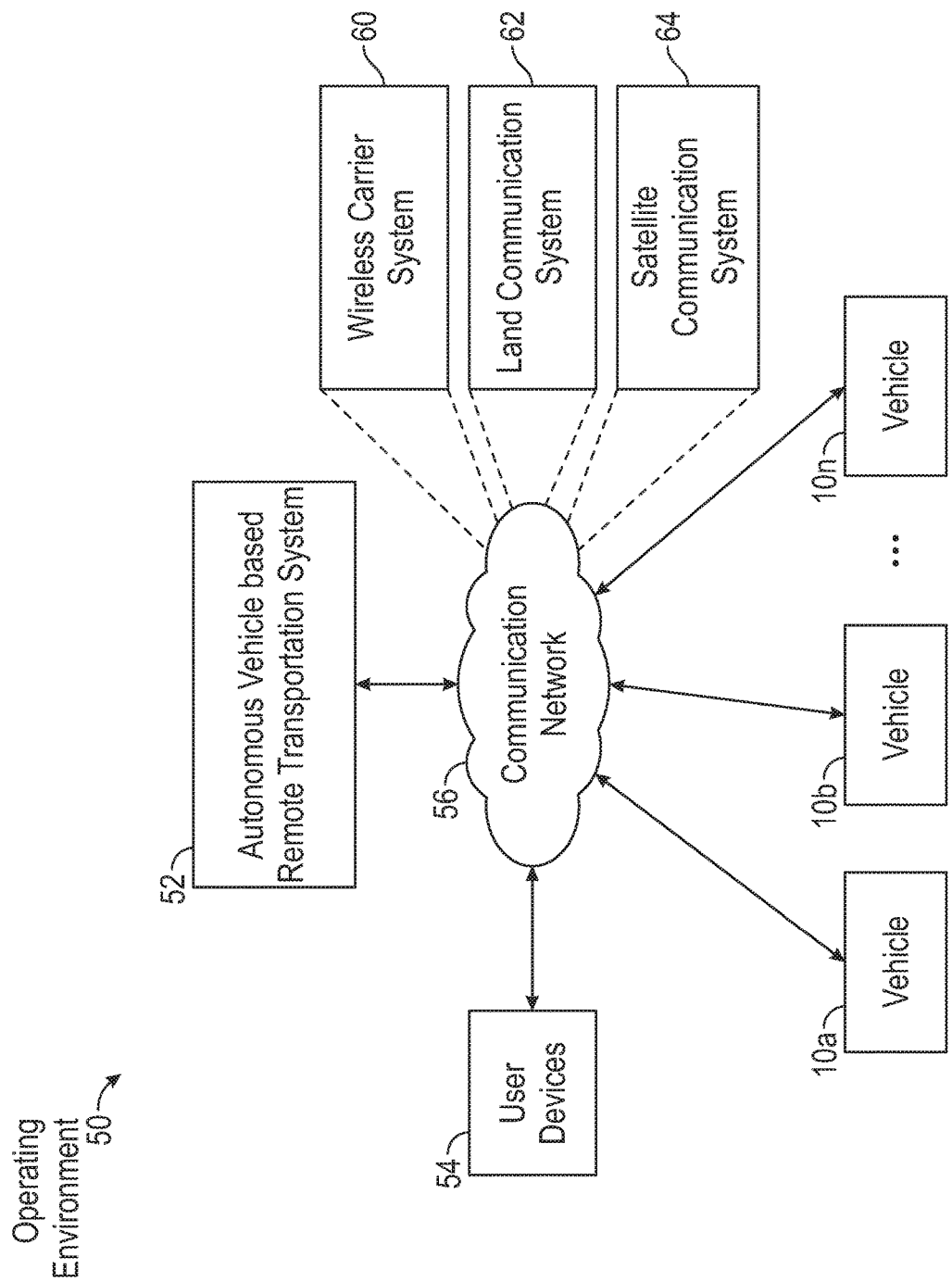
FIG. 2 is a functional block diagram illustrating a transportation system having one or more autonomous vehicles of FIG. 1, in accordance with various embodiments.

Still referring to FIG. 1, in exemplary embodiments, the communication system 36 is configured to wirelessly communicate information to and from other entities 48, such as but not limited to, other vehicles ("V2V" communication,) infrastructure ("V2I" communication), remote systems, and/ or personal devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

With reference now to FIG. 2, in various embodiments, the autonomous vehicle 10 described with regard to FIG. 1 may be suitable for use in the context of a taxi or shuttle system in a certain geographical area (e.g., a city, a school or business campus, a shopping center, an amusement park, an event center, or the like) or may simply be managed by a remote system. For example, the autonomous vehicle 10 may be associated with an autonomous vehicle based remote transportation system. FIG. 2 illustrates an exemplary embodiment of an operating environment shown generally at 50 that includes an autonomous vehicle based remote transportation system 52 that is associated with one or more instances of autonomous vehicles 10a-10n as described with regard to FIG. 1. In various embodiments, the operating environment 50 further includes one or more user devices 54 that communicate with the autonomous vehicle 10 and/or the remote transportation system 52 via a communication network 56.

The communication network 56 supports communication as needed between devices, systems, and components supported by the operating environment 50 (e.g., via tangible communication links and/or wireless communication links). For example, the communication network 56 can include a wireless carrier system 60 such as a cellular telephone system that includes a plurality of cell towers (not shown), one or more mobile switching centers (MSCs) (not shown), as well as any other networking components required to connect the wireless carrier system 60 with a land communications system. Each cell tower includes sending and receiving antennas and a base station, with the base stations from different cell towers being connected to the MSC either directly or via intermediary equipment such as a base station controller. The wireless carrier system 60 can implement any suitable communications technology, including for example, digital technologies such as CDMA (e.g., CDMA2000), LTE (e.g., 4G LTE or 5G LTE), GSM/GPRS, or other current or emerging wireless technologies. Other cell tower/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from including the wireless carrier system 60, a second wireless carrier system in the form of a satellite communication system 64 can be included to provide uni-directional or bi-directional communication with the autonomous vehicles 10a-10n. This can be done using one or more communication satellites (not shown) and an uplink transmitting station (not shown). Uni-directional communication can include, for example, satellite radio services, wherein programming content (news, music, etc.) is received by the transmitting station, packaged for upload, and then sent to the satellite, which broadcasts the programming to subscribers. Bi-directional communication can include, for example, satellite telephony services using the satellite to relay telephone communications between the vehicle 10 and the station. The satellite telephony can be utilized either in addition to or in lieu of the wireless carrier system 60.

A land communication system 62 may further be included that is a conventional land-based telecommunications network connected to one or more landline telephones and connects the wireless carrier system 60 to the remote transportation system 52. For example, the land communication system 62 may include a public switched telephone network (PSTN) such as that used to provide hardwired telephony, packet-switched data communications, and the Internet infrastructure. One or more segments of the land communication system 62 can be implemented through the use of a standard wired network, a fiber or other optical network, a cable network, power lines, other wireless networks such as wireless local area networks (WLANs), or networks providing broadband wireless access (BWA), or any combination thereof. Furthermore, the remote transportation system 52 need not be connected via the land communication system 62, but can include wireless telephony equipment so that it can communicate directly with a wireless network, such as the wireless carrier system 60.

Although only one user device 54 is shown in FIG. 2, embodiments of the operating environment 50 can support any number of user devices 54, including multiple user devices 54 owned, operated, or otherwise used by one person. Each user device 54 supported by the operating environment 50 may be implemented using any suitable hardware platform. In this regard, the user device 54 can be realized in any common form factor including, but not limited to: a desktop computer; a mobile computer (e.g., a tablet computer, a laptop computer, or a netbook computer); a smartphone; a video game device; a digital media player; a piece of home entertainment equipment; a digital camera or video camera; a wearable computing device (e.g., smart watch, smart glasses, smart clothing); or the like. Each user device 54 supported by the operating environment 50 is realized as a computer-implemented or computer-based device having the hardware, software, firmware, and/or processing logic needed to carry out the various techniques and methodologies described herein. For example, the user device 54 includes a microprocessor in the form of a programmable device that includes one or more instructions stored in an internal memory structure and applied to receive binary input to create binary output. In some embodiments, the user device 54 includes a GPS module capable of receiving GPS satellite signals and generating GPS coordinates based on those signals. In other embodiments, the user device 54 includes cellular communications functionality such that the device carries out voice and/or data communications over the communication network 56 using one or more cellular communications protocols, as are discussed herein. In various embodiments, the user device 54 includes a visual display, such as a touch-screen graphical display, or other display.

The remote transportation system 52 includes one or more backend server systems, which may be cloud-based, network-based, or resident at the particular campus or geographical location serviced by the remote transportation system 52. The remote transportation system 52 can be manned by a live advisor, or an automated advisor, or a combination of both. The remote transportation system 52 can communicate with the user devices 54 and the autonomous vehicles 10a-10n to schedule rides, dispatch autonomous vehicles 10a-10n, and the like. In various embodiments, the remote transportation system 52 stores store account information such as subscriber authentication information, vehicle identifiers, profile records, behavioral patterns, and other pertinent subscriber information.

In accordance with a typical use case workflow, a registered user of the remote transportation system 52 can create a ride request via the user device 54. The ride request will typically indicate the passenger's desired pickup location (or current GPS location), the desired destination location (which may identify a predefined vehicle stop and/or a user-specified passenger destination), and a pickup time. The remote transportation system 52 receives the ride request, processes the request, and dispatches a selected one of the autonomous vehicles 10a-10n (when and if one is available) to pick up the passenger at the designated pickup location and at the appropriate time. The transportation system 52 can also generate and send a suitably configured confirmation message or notification to the user device 54, to let the passenger know that a vehicle is on the way.

As can be appreciated, the subject matter disclosed herein provides certain enhanced features and functionality to what may be considered as a standard or baseline autonomous vehicle 10 and/or an autonomous vehicle based remote transportation system 52. To this end, an autonomous vehicle and autonomous vehicle based remote transportation system can be modified, enhanced, or otherwise supplemented to provide the additional features described in more detail below.

Figure 3:
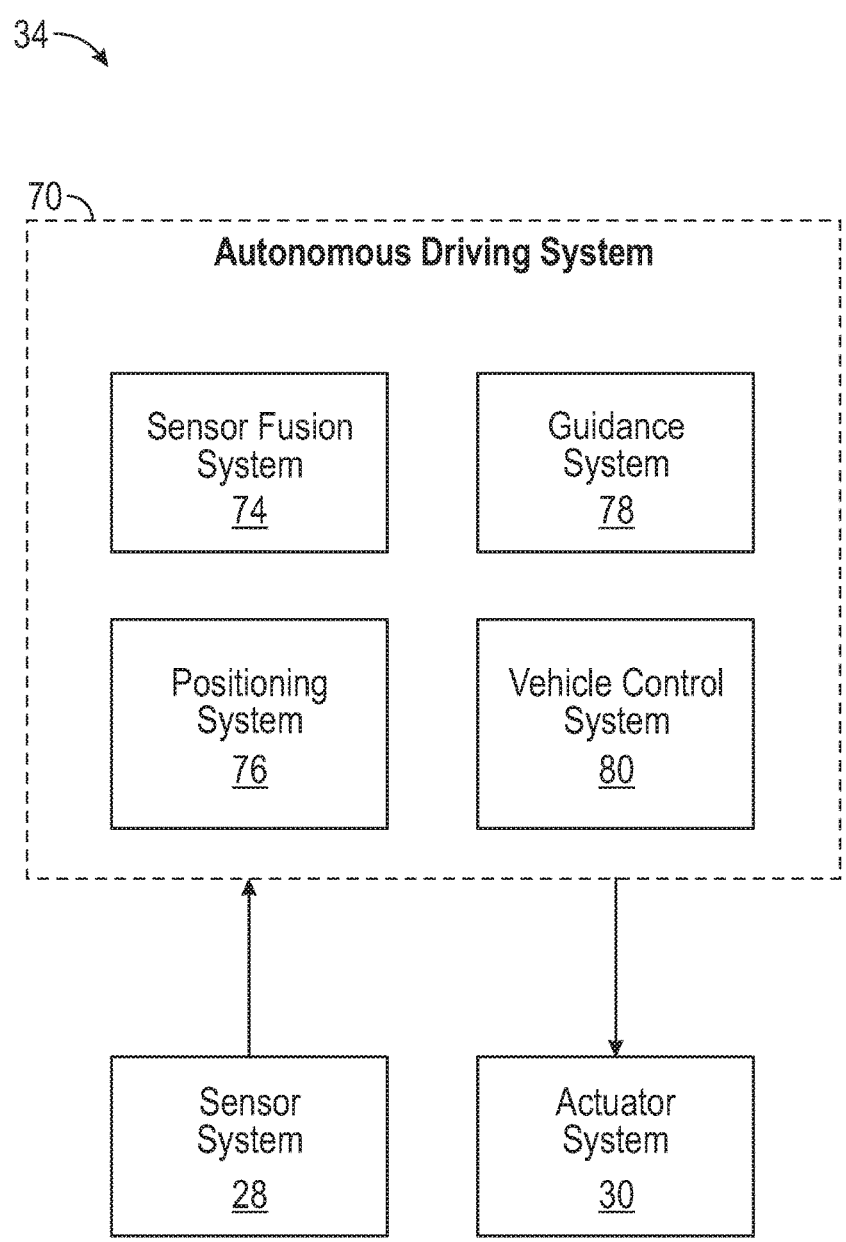
FIG. 3 is a schematic block diagram of an automated driving system (ADS) suitable for implementation by the vehicle of FIG. 1 in accordance with various embodiments.

Referring now to FIG. 3, in accordance with various embodiments, controller 34 implements an autonomous driving system (ADS) 70 as shown in FIG. 3. That is, suitable software and/or hardware components of controller 34 (e.g., processor 44 and computer-readable storage device 46) are utilized to provide an autonomous driving system 70 that is used in conjunction with vehicle 10, for example, to automatically control various actuators 30 and thereby control vehicle acceleration, steering, and braking, respectively, without human intervention.

In various embodiments, the instructions of the autonomous driving system 70 may be organized by function or system. For example, as shown in FIG. 3, the autonomous driving system 70 can include a sensor fusion system 74, a positioning system 76, a guidance system 78, and a vehicle control system 80. As can be appreciated, in various embodiments, the instructions may be organized into any number of systems (e.g., combined, further partitioned, etc.) as the disclosure is not limited to the present examples.

In various embodiments, the sensor fusion system 74 synthesizes and processes sensor data and predicts the presence, location, classification, and/or path of objects and features of the environment of the vehicle 10. In various embodiments, the sensor fusion system 74 can incorporate information from multiple sensors, including but not limited to cameras, lidars, radars, and/or any number of other types of sensors. In one or more exemplary embodiments described herein, the sensor fusion system 74 supports or otherwise performs the data collection, calibration, and calibration verification processes described herein in greater detail below in the context of FIGS. 6-12. In exemplary embodiments, the sensor fusion system 74 correlates image data with the lidar point cloud data using calibrated conversion parameter values associated with the camera-lidar pair that is the respective source of the image and lidar point cloud data sets to assign depths to the image data, identify objects in one or more of the image data and the lidar data, or otherwise synthesize associated image data and lidar data. In other words, the sensor output from the sensor fusion system 74 provided to the vehicle control system 80 (e.g., indicia of detected objects and/or their locations relative to the vehicle 10) reflects or is otherwise influenced by the calibrations and associations between camera images and lidar point cloud data.

The positioning system 76 processes sensor data along with other data to determine a position (e.g., a local position relative to a map, an exact position relative to lane of a road, vehicle heading, velocity, etc.) of the vehicle 10 relative to the environment. The guidance system 78 processes sensor data along with other data to determine a path for the vehicle 10 to follow. The vehicle control system 80 generates control signals for controlling the vehicle 10 according to the determined path.

In various embodiments, the controller 34 implements machine learning techniques to assist the functionality of the controller 34, such as feature detection/classification, obstruction mitigation, route traversal, mapping, sensor integration, ground-truth determination, and the like.

Figure 4:
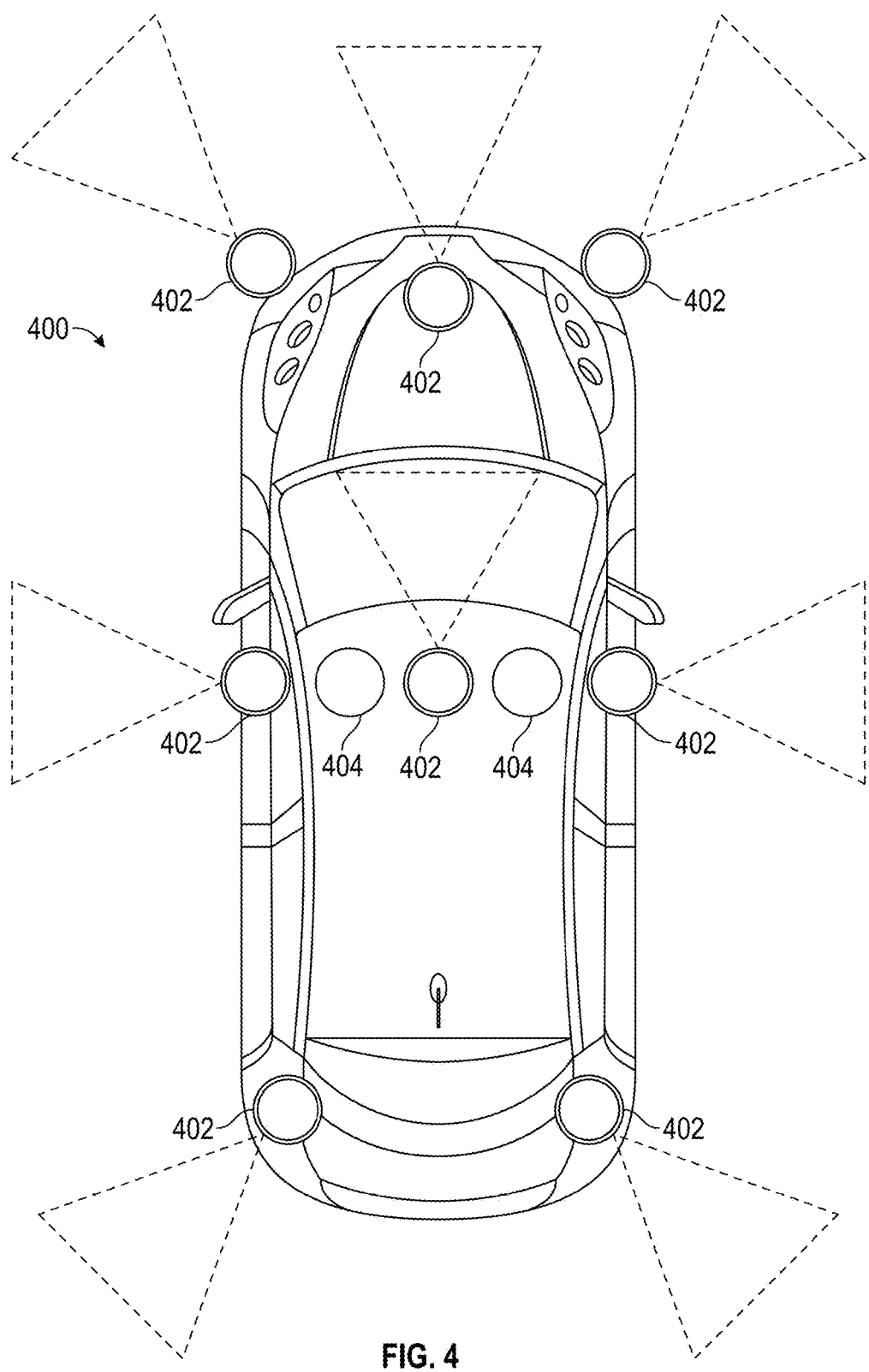
FIG. 4 is an illustration of an arrangement of a plurality of imaging devices and a plurality of ranging devices onboard a vehicle such as the autonomous vehicle of FIG. 1 in accordance with various embodiments.

FIG. 4 depicts an exemplary vehicle 400 that includes a plurality of cameras 402 distributed about the vehicle 400 and a plurality of ranging devices 404 distributed about the vehicle 400. The cameras 402 are disposed at different locations and oriented to provide different field of views that capture different portions of the surrounding environment in the vicinity of the vehicle 400. For example, a first camera 402 is positioned at the front left (or driver) side of the vehicle 400 and has its field of view oriented 45° counterclockwise relative to the longitudinal axis of the vehicle 400 in the forward direction, and another camera 402 may be positioned at the front right (or passenger) side of the vehicle 400 and has its field of view oriented 45° clockwise relative to the longitudinal axis of the vehicle 400. Additional cameras 402 are positioned at the rear left and right sides of the vehicle 400 and similarly oriented away from the longitudinal axis at 45° relative to the vehicle longitudinal axis, along with cameras 402 positioned on the left and right sides of the vehicle 400 and oriented away from the longitudinal axis perpendicular to the vehicle longitudinal axis. The illustrated embodiment also includes a pair of cameras 402 positioned at or near the vehicle longitudinal axis and oriented to capture a forward looking field of view along a line of sight substantially parallel to the vehicle longitudinal axis.

In exemplary embodiments, the cameras 402 have angle of views, focal lengths, and other attributes that may be different from those of one or more other cameras 402. For example, the cameras 402 on the right and left sides of the vehicle may have an angle of view that is greater than the angle of view associated with the cameras 402 positioned at the front left, front right, rear left, or rear right of the vehicle. In some embodiments, the angle of view of the cameras 402 are chosen so that the field of view of different cameras 402 overlap, at least in part, to ensure camera coverage at particular locations or orientations relative to the vehicle 400.

One of more ranging devices 404 are also disposed at different locations of the vehicle 400, and in one embodiment, are disposed symmetrically about the longitudinal axis of the vehicle 400 to achieve parallax. In exemplary embodiments described herein, the ranging devices 404 are realized as lidar devices. In this regard, each of the ranging devices 404 may include or incorporate one or more lasers, scanning components, optical arrangements, photodetectors, and other components suitably configured to horizontally and rotatably scan the environment in the vicinity of the vehicle 400 with a particular angular frequency or rotational velocity. For example, in one embodiment, each lidar device 404 is configured to horizontally rotate and scan 360° at a frequency of 10 Hertz (Hz). As used herein, a lidar scan should be understood as referring to a single revolution of a lidar device 404.

In exemplary embodiments described herein, the cameras 402 autonomously and automatically captures images at a particular frequency, and the frequency or rate at which the cameras 402 capture images is greater than the angular frequency of the lidar devices 404. In one embodiment, the frequency or sampling rate of the cameras 402 is at least twice the angular frequency of the lidar device 404. For example, the cameras 402 may capture new image data corresponding to their respective field of view at a rate of 30 Hz while the lidar device 404 scans and automatically provides updated data at a rate of 10 Hz. Thus, each camera 402 may capture multiple images per lidar scan, and capture the images at different times independent of the orientation of the lidar device 404 or the angular position within the scan. In such embodiments, an image from each respective camera 402 that is temporally associated with the lidar point cloud data from a particular lidar scan may be selected or identified based on the relative time difference between when the image is obtained and when the angular position of the lidar scan corresponds to the line of sight of a lidar device 404 being aligned with the line of sight or the angle of view of the respective camera 402. In other embodiments, images obtained during a lidar scan may be fused or otherwise combined to achieve a representative image corresponding to the lidar scan. In yet other embodiments, the cameras 402 may be triggered or otherwise controlled to capture images at the instance in time during a lidar scan when the angular position of the lidar scan corresponds to the line of sight of a lidar device 404 being aligned with the line of sight or the angle of view of the respective camera 402. In this regard, it should be understood there are numerous different ways to synchronize or temporally associate different data sets, and the subject matter described herein is not intended to be limited to any particular manner for identifying or associating image data of a region with a lidar scan of that region or corresponding lidar data representative of that region.

Figure 5:
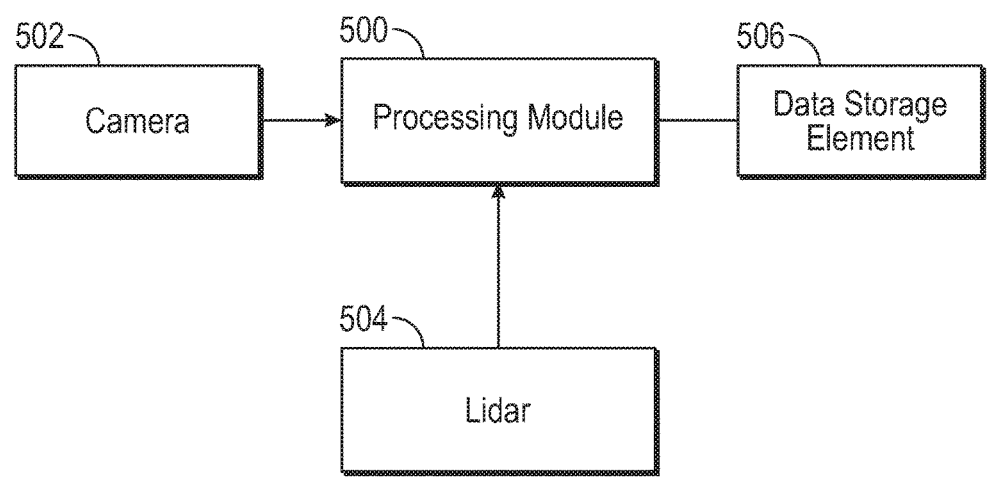
FIG. 5 is a block diagram of a processing module for implementation onboard the vehicle of FIG. 1 or FIG. 4 in accordance with one or more exemplary embodiments.

FIG. 5 depicts an embodiment of a processing module 500 (or control module) which may be implemented by or incorporated into the controller 34, the processor 44, and/or the sensor fusion system 74. The image processing module 500 is coupled to a camera 502 (e.g., one of cameras 402) onboard the vehicle and a lidar device 504 (e.g., one of lidar devices 404) onboard the vehicle. It should be noted that although FIG. 5 depicts a single camera 502, in practice, the image processing module 500 may be coupled to multiple cameras 40, 402 onboard a vehicle 10, 400 to temporally associate and correlate images from multiple cameras 40, 402 to the lidar point cloud data of an individual scan of the lidar device 504 and perform the calibration-related processes described herein with respect to multiple cameras 40, 402 substantially concurrently or in parallel. Additionally, the image processing module 500 may be coupled to additional lidar devices 40, 504 onboard the vehicle 10, 400 to temporally associate and correlate different images from the onboard cameras 40, 402, 502 to the lidar point cloud data from scans of different lidar devices 40, 404, 504, and thereby perform the calibration-related processes described herein with respect to multiple cameras 40, 402 and multiple lidar devices 40, 404, 504 substantially concurrently or in parallel.

In one or more embodiments, the image processing module 500 is configured to buffer, store or otherwise maintain image data corresponding to one or more images (or samples) captured by the camera 502 per lidar scan and select or otherwise identify an image in the buffer that is temporally associated with the lidar device 504 being aligned with the field of view of the camera 502 (e.g., based on the timestamps associated with the images in the buffer). For example, based on a signal or indication received from the lidar device 504 indicating when the lidar device 504 is aligned at its starting or reference orientation within a scan, the angular frequency of the lidar device 504, and then angle or orientation of the camera 502, the image processing module 500 may calculate a sampling time at which the line of sight of the lidar device 504 is aligned with the camera 502, alternatively referred to herein as the lidar sampling time, and select the image data set having a timestamp that is closest to the lidar sampling time for associating or correlating with lidar data representative of the field of view of the camera.

The image processing module 500 is coupled to the lidar device 504 to retrieve or otherwise obtain the lidar point cloud data from a lidar scan, and then correlates at least a portion of the lidar point cloud data to the temporally associated image data. For example, the image processing module 500 may select or otherwise identify the subset of the lidar point cloud data corresponding to the lidar device 504 traversing the angle of view of the camera 502.

As described in greater detail below, in exemplary embodiments, the image processing module 500 calibrates the relationship between the camera 502 and the lidar device 504 and stores or otherwise maintains the calibration data characterizing the relationship in the data storage element 506. In this regard, the calibration data may include values for variables of a function for spatially translating from the lidar point cloud reference frame to the image data reference frame, or vice versa. Thereafter, when correlating subsequent image data with point cloud data, the image processing module 500 may utilize the calibration data to project the lidar data onto the image data to assign depths, distances, or other dimensional characteristics to the image data. In this manner, the correlation between image data and point cloud data may be utilized by the image processing module 500 to detect objects for subsequent classification and prediction and provide such preprocessed output to one or more additional object or obstacle analysis modules, vehicle control modules, or the like.

Figure 6:
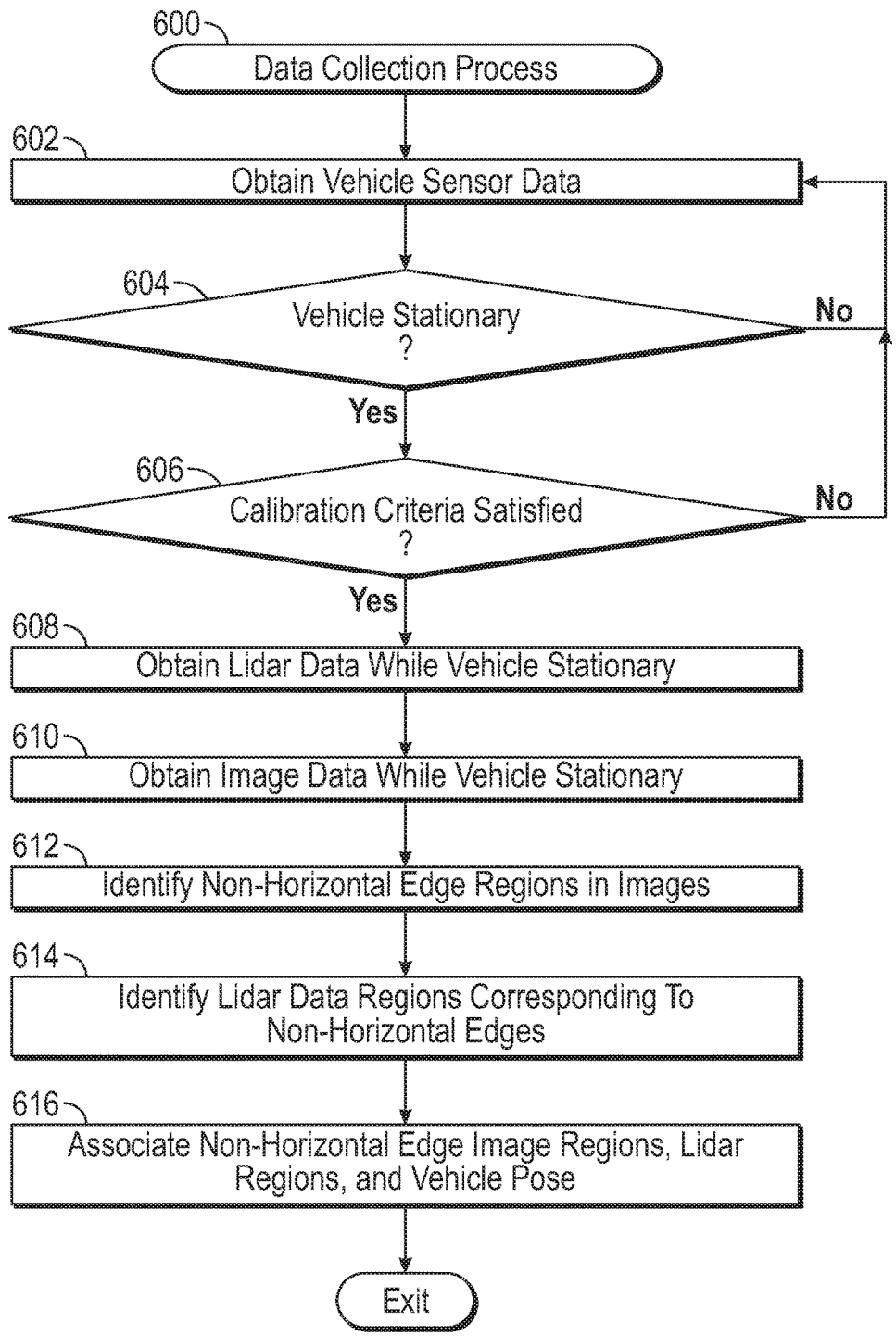
FIG. 6 is a flowchart illustrating a data collection process for obtaining data sets for subsequent calibration or verification thereof in accordance with one or more exemplary embodiments.

Referring now to FIG. 6, and with continued reference to FIGS. 1-5, a flow diagram illustrates various embodiments of a data collection process 600 which may be embedded within a controller 34 in the control system 100 of FIG. 1 supporting the ADS 70. In this regard, the data collection process 600 may be implemented or performed by one or more control modules 34, 44, 500 onboard a vehicle 10, 400. As can be appreciated in light of the disclosure, the order of operation within the method is not limited to the sequential execution as illustrated in FIG. 6, but may be performed in one or more varying orders as applicable and in accordance with the present disclosure. Moreover, one or more of the tasks shown and described in the context of FIG. 6 could be omitted from a practical embodiment of the data collection process 600 while still achieving the generally intended overall functionality. In various embodiments, the data collection process 600 can be scheduled to run based on one or more predetermined events, and/or can run continuously during operation of the autonomous vehicle 10, 400.

In exemplary embodiments, the data collection process 600 may be performed to collect pairs of image data and lidar data for calibrating the relationship between a respective camera and lidar device, or alternatively, for verifying the validity or accuracy of the calibration on an ongoing basis. The illustrated data collection process 600 begins by receiving or otherwise obtaining data from one or more onboard vehicle sensors at 602 and detecting or otherwise identifying when the vehicle is stationary at 604. For example, as described above, a control module 34, 500 onboard the vehicle may be coupled to one or more onboard vehicle sensors 40 providing respective outputs that may be analyzed or monitored to determine when the vehicle 10, 400 is stationary, such as speed sensors, positioning sensors, throttle sensors, brake sensors, and the like. In this regard, the data collection process 600 may detect a stationary condition of the vehicle 10, 400 when the speed or velocity of the vehicle 10, 400 is equal to zero, the acceleration of the vehicle 10, 400 is equal to zero, and the position of the vehicle 10, 400 is stable or unchanged. In this manner, the data collection process 600 ensures the collected data sets used for the calibration will not include noise or other artifacts that could be introduced by movement of the vehicle 10, 400.

In one or more embodiments, the data collection process 600 also verifies or otherwise confirms that one or more calibration criteria are satisfied based on the current vehicle pose at 606. In this regard, some embodiments, the data collection process 600 may impose one or more minimum thresholds by which the current vehicle pose must deviate from vehicle poses associated with previously collected data sets to ensure the scene or environment represented by the collected data sets is not substantially similar to that of previously collected data sets to ensure sufficiently different depth discontinuities. For example, the data collection process 600 may require that the distance between the current vehicle position and a previous vehicle position associated with one or more previously collected data sets is greater than a minimum threshold distance, that the difference between the current orientation or heading associated with the current vehicle position and the orientations or headings associated with one or more previously collected data sets is greater than a minimum threshold difference, a time difference between the time associated with the current vehicle pose and a time associated with a previously collected data set is greater than a minimum time difference, or some combination thereof. In this manner, the data collection process 600 may ensure that the vehicle has change pose by enough to ensure that the scene or environment represented by the current data sets is likely to be different from that associated with previously collected data sets, or alternatively, that the time difference between data sets is likely to result in differences between the scene or environment represented by the current data sets and those of previously collected data sets.

In some embodiments of the data collection process 600 may utilize a map database to determine, based on the current vehicle pose relative to the map, a likely environment around the vehicle (e.g., a busy intersection versus a parking lot, or the like), and then based on the type of environment or characteristics of the environment, adjust the calibration criteria accordingly. For example, when the vehicle is exhibiting a stationary condition at a traffic light for a busy intersection, the data collection process 600 may only require a minimum time difference (e.g., 1 second) between data sets without requiring a change in vehicle pose, but conversely, when the stationary condition occurs in a parking lot, the data collection process 600 may require a minimum change in vehicle pose between data sets.

Once the data collection process 600 detects a stationary condition that satisfies applicable calibration criteria, the data collection process 600 continues by receiving or otherwise obtaining lidar data corresponding to the field of view of the camera being calibrated that was captured during the stationary condition at 608 and receiving or otherwise obtaining image data corresponding to the field of view of the camera being calibrated that was captured during the stationary condition and temporally associated with the lidar data at 610. In this regard, the control module 34, 500 obtains a subset of lidar data that corresponds to the lidar device 504 traversing the field of view of the camera 502, and then also selects or otherwise obtains the image data from the camera 502 that most closely corresponds to the instance(s) in time during the stationary condition at which the lidar device 504 traversed the field of view or line of sight of the camera 502.

Figure 7:
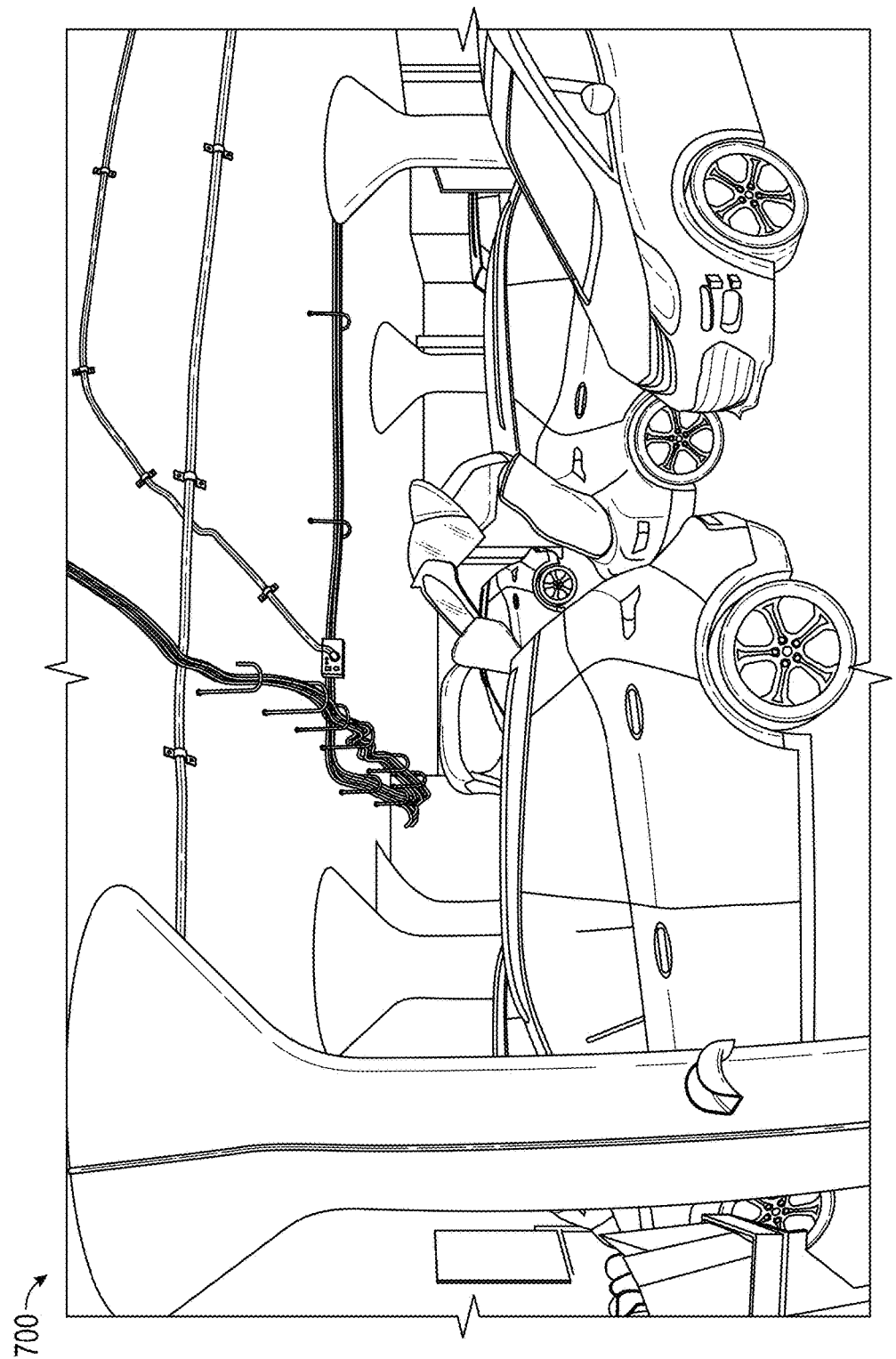
FIG. 7 depicts an exemplary image of an environment representative of a captured field of view of a camera onboard a vehicle.
Figure 8:
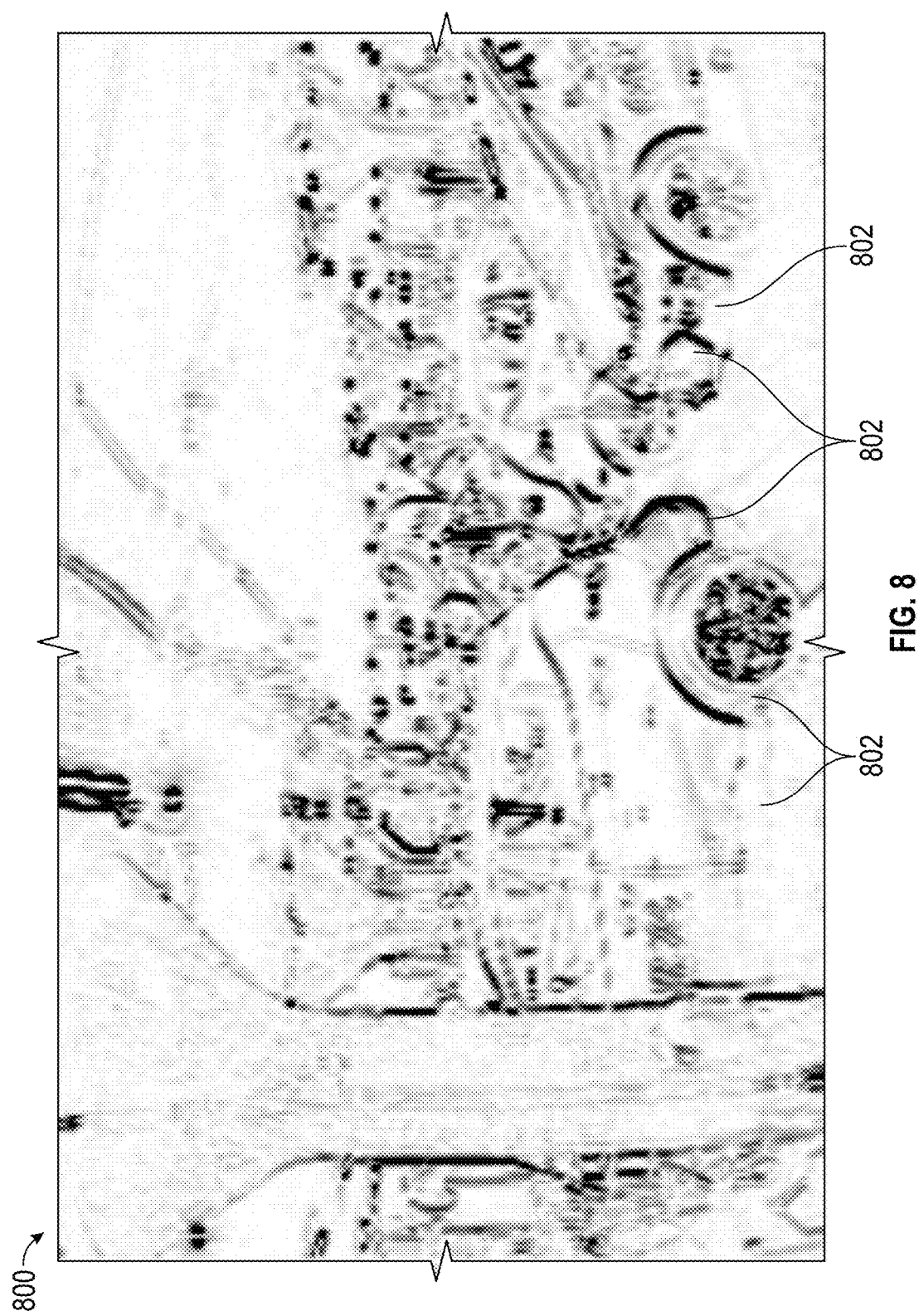
FIG. 8 depicts an exemplary filtered version of the image of FIG. 7 that illustrates filtering of horizontal edges and retention of non-horizontal edges of image data suitable for use in conjunction with the data collection process of FIG. 6.

Once temporally associated sets of lidar and image data captured during the stationary condition are obtained, the data collection process 600 continues by filtering or otherwise processing the image data to identify non-horizontal edge regions at 612, and thereby filters or otherwise excludes horizontal edge regions from further analysis or usage during calibration. For example, FIG. 7 depicts an exemplary unfiltered image 700 captured by a camera of an environment within the field of view of the camera, and FIG. 8 depicts an exemplary filtered version of the image 800 that includes only non-horizontal edge regions 802. To obtain a filtered image 800 that filters or removes horizontal edges and retains only non-horizontal edge regions 802, the control module 34, 500 converts pixels of the original image 700 to a grayscale intensity value, performs Gaussian smoothing of the grayscale intensity values to reduce noise and then applies a filter, such as a Sobel filter, that identify regions where intensity values change moving horizontally along a row of pixels or diagonally among pixels while filtering out vertical intensity changes along a column of pixels (i.e., horizontal edges). Thereafter, the control module 34, 500 identifies the remaining regions 802 of pixels where sufficient intensity changes exist in the horizontal or diagonal directions as non-horizontal edge regions of image data to be used for subsequent calibration and/or calibration verification.

Referring again to FIG. 6, after the non-horizontal edge regions of image data are identified, the data collection process 600 continues by selecting or otherwise identifying corresponding regions in the lidar data for associating with the non-horizontal edge regions of image data at 614. In this regard, the control module 34, 500 selects or otherwise identifies subsets of the lidar point cloud data where changes in depth or distance occur when moving horizontally along the lidar scan horizontal reference plane. In one exemplary embodiment, the lidar data point cloud includes thirty-two horizontal scan lines (or rows), where the control module 34, 500 selects or otherwise identifies a point from within each row where the depth discontinuity is greatest relative to neighboring points of that row, and then retains those thirty-two points and their relative locations within the point cloud and depth information as the regions in the lidar data for associating with the non-horizontal edge regions of image data. In this regard, limiting the number of points utilized for the calibration reduces computation time and improves calibration accuracy by choosing points with more significant depth discontinuities.

Figure 9:
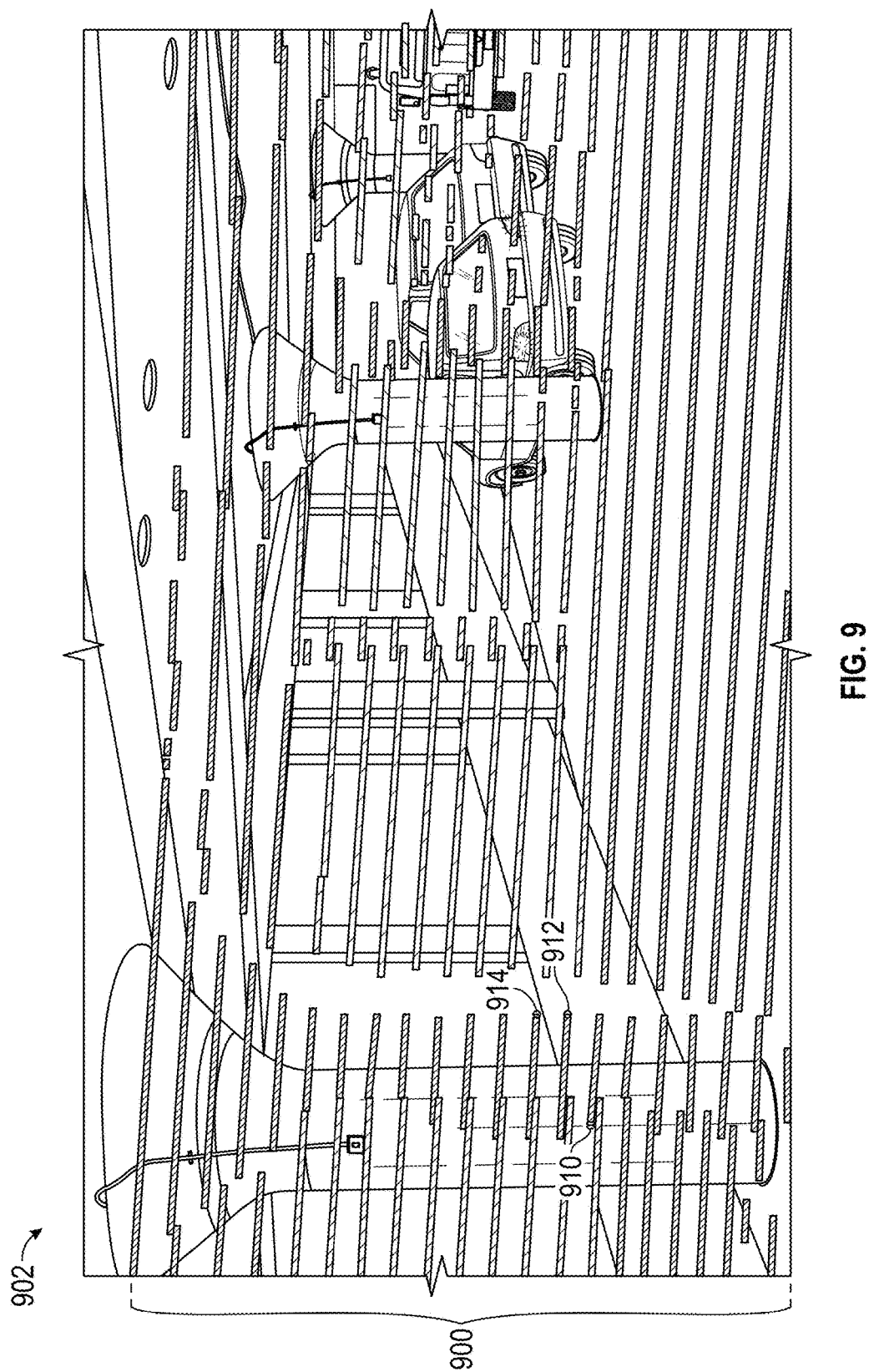
FIG. 9 depicts an exemplary representation of uncalibrated ranging data with respect to an underlying image of a captured field of view of a camera onboard a vehicle suitable for correlation in conjunction with the data collection process of FIG. 6.

FIG. 9 depicts a graphical representation of uncalibrated lidar scan data 900 of an environment corresponding to a field of view of a camera overlaid on an example image 902 of the environment, where the shading or fill pattern of the lidar scan data 900 generally corresponds to the measured depth or distance from the lidar device. In this regard, FIG. 9 depicts an uncalibrated relationship between the lidar scan data 900 and the example image 902, so that the depth discontinuities along rows corresponding to the horizontal reference plane of the lidar device 504 are not necessarily aligned with corresponding features or elements in the image 902. The lidar scan data 900 includes a plurality of rows of points having different depths or distances relative to the lidar device 504 associated therewith. To identify non-horizontal edge regions for associating with image data, the control module 34, 500 may analyze the rows of lidar data 900 and identify points where depths or distances change by more than a threshold amount when moving horizontally across points within a row, and select or otherwise identify those points as a non-horizontal edge.

As described above, among the non-horizontal edge points within the row, the point having the greatest difference in depth or distance relative to its adjacent points in the row may be identified or selected as the point from within that row having the greatest depth discontinuity that is retained for correlating with non-horizontal edge regions of image data. In this regard, from among points have substantially equal depth discontinuities within the same row, the point having the minimum depth or distance from the lidar device (e.g., the point closest to the vehicle) may be selected and retained for subsequent analysis due to the likelihood that edges closer to the vehicle are likely to be measured or observed with greater accuracy and precision than distant objects. For example, a point 910 corresponding to the left edge of the pillar may be selected as the point with greatest depth discontinuity within its respective row of the lidar scan data 900, while points 912, 914 corresponding to the right edge of the pillar may be selected as the points with greatest depth discontinuity within their respective rows of the lidar scan data 900. The substantially vertical left edge of the pillar identified within a captured image of the environment 902 may be correlated with the point 910 (and potentially other points from lower rows of lidar data 900) and the substantially vertical right edge of the pillar identified within a captured image of the environment 902 may be correlated with the points 912, 914 (and potentially other points from higher rows of lidar data 900) for determining transformation parameters for converting between the points 910, 912, 914 within the lidar data 900 and the corresponding pixel locations for the respective edges of the pillar in the image data, as described herein.

Referring again to FIG. 6, after the data collection process 600 identifies the non-horizontal edge region image data subsets and the non-horizontal edge region lidar data subsets, the data collection process 600 stores or otherwise maintains the correlated non-horizontal edge region data subsets in association with one another and the current vehicle pose at 616. In this regard, the control module 34, 500 stores, in the data storage element 506, the pixel locations for the non-horizontal edge regions of the image (identified at 612) and the corresponding image data, the three-dimensional points (relative location and depth or distance) within the point cloud that were selected based on depth discontinuities along a horizontal scan line (identified at 614), and information characterizing or quantifying the current vehicle pose (e.g., positioning coordinates, heading, elevation, and the like) and the time associated therewith.

The data collection process 600 may be repeated to continually detect or otherwise identify stationary vehicle conditions of a vehicle that satisfy calibration criteria, and obtain corresponding data sets for calibrating onboard devices or verifying existing calibrations. For example, the data collection process 600 may be performed to initially obtain at least a minimum threshold number of paired data sets before calibrating the relationship between a camera 502 and a lidar device 504. In one embodiment, after startup of a vehicle 10, 400, the data collection process 600 is performed a threshold number of times to obtain data sets for calibrating the relationship between a camera 502 and a lidar device 504 for subsequent vehicle operation. After calibration, the data collection process 600 may be repeated to obtain data sets during stationary vehicle conditions and verify the existing calibration substantially in real-time. Thereafter, if the calibration is not verified, the data collection process 600 may be performed to obtain additional data sets for recalibrating the relationship between a camera 502 and a lidar device 504, as described in greater detail below.

Figure 10:
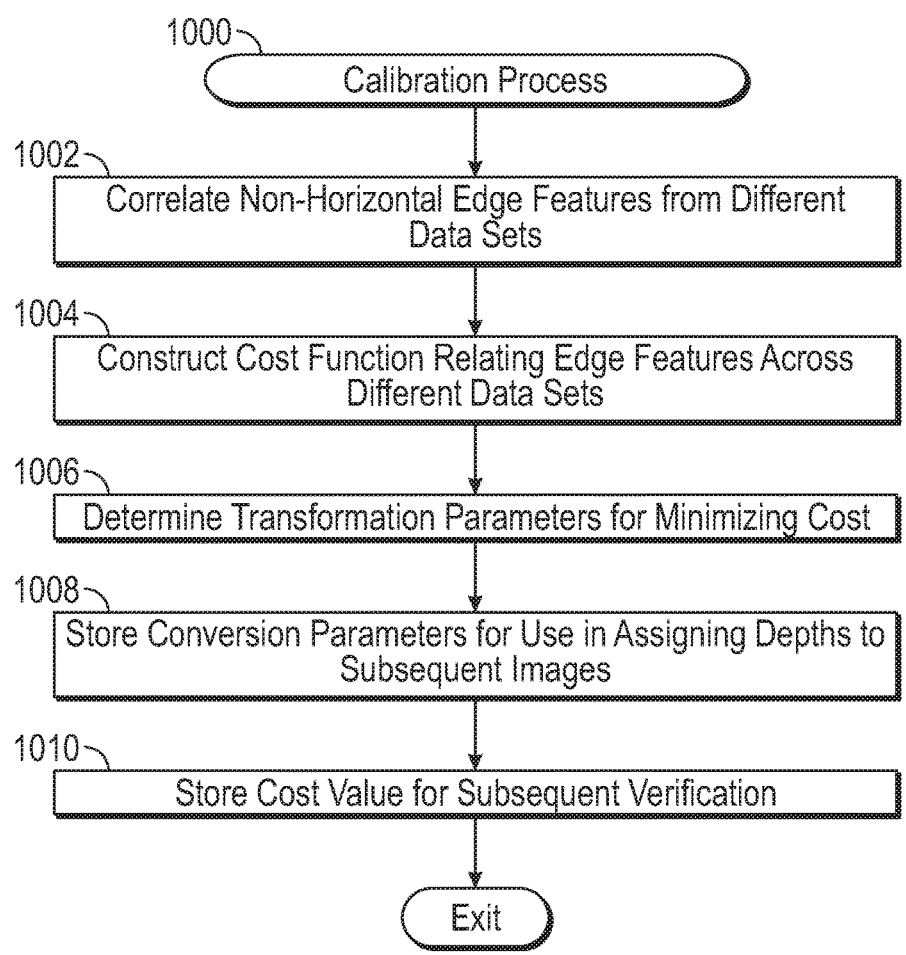
FIG. 10 is a flowchart illustrating a calibration process for calibrating a pair of devices using data sets collected in accordance with the data collection process of FIG. 6 in accordance with one or more exemplary embodiments.

Referring now to FIG. 10, and with continued reference to FIGS. 1-6, in exemplary embodiments, a calibration process 1000 is embedded within a control module 34, 500 onboard a vehicle 10, 400 for calibrating relationships between cameras 502 and lidar devices 504 onboard the vehicle 10, 400 using one or more data sets collected in accordance with the data collection process 600. That said, the calibration process 1000 is not necessarily limited to implementation in conjunction with the data collection process 600, and the order of operations are not necessarily limited to the sequential execution illustrated in FIG. 10, but may be performed in one or more varying orders as applicable and in accordance with the present disclosure. Moreover, one or more of the tasks shown and described in the context of FIG. 10 could be omitted from a practical embodiment of the calibration process 1000 while still achieving the generally intended overall functionality. In various embodiments, the calibration process 1000 can be scheduled to run based on one or more predetermined events, and/or can run periodically during operation of the autonomous vehicle 10, 400 (e.g., to dynamically updated the calibration using more recent sets of data).

The calibration process 1000 correlates or otherwise associates non-horizontal edge features between paired data sets at 1002 and constructs or otherwise generates a cost function that characterizes the correlations between non-horizontal edge features across paired data sets at 1004. In this regard, each non-horizontal edge region of image data of a paired data set is spatially related to a corresponding non-horizontal edge region of image data of a paired data set with an equation characterizing the transformation from the point cloud reference frame to the pixel reference frame (or pixel locations) as a function of translation and rotation parameters for transforming or converting a point within the lidar point cloud to a relative pixel location and vice versa.

Thereafter, the calibration process 1000 calculates or otherwise determines values for transformation parameters that minimize the cost associated with the transformation at 1006. Expressed another way, the calibration process 1000 minimizes the cost of transforming between camera and lidar reference frames across all of the paired data sets by determining values for the conversion parameters that minimizes the overall cost in terms of the differences between a transformed location and the actual location of a correlated edge feature. For example, in one embodiment, the calibration process 1000 determines values for six transformation parameters, three translational parameter values (e.g., x-axis, y-axis, and z-axis) and three rotational (e.g., pitch, roll, and yaw), that minimize the cumulative differences between transformed pixel locations calculated based on non-horizontal edge regions of lidar data and the actual pixel locations of the non-horizontal edge regions of image data that correspond to the respective non-horizontal edge regions of lidar data.

The calibration process 1000 stores or otherwise maintains the resulting parameter values that minimize transformation cost in association with the camera-lidar device pairing at 1008. In this regard, the control module 34, 500 stores or maintains the translational and rotational parameter values for translating from the point cloud reference frame of the lidar device 504 to the image pixel frame of the paired camera 502 in the data storage element 506 in association with one or more identifiers for the camera 502 and/or the lidar device 504 for transforming subsequent lidar data corresponding to the camera field of view from the lidar device 504 to corresponding pixel locations, or vice versa. In this manner, depth or distance information associated with lidar points may be assigned to pixel locations within images captured by the camera 502 to thereby project or otherwise assign different depths or distances to different portions of the image.

Figure 11:
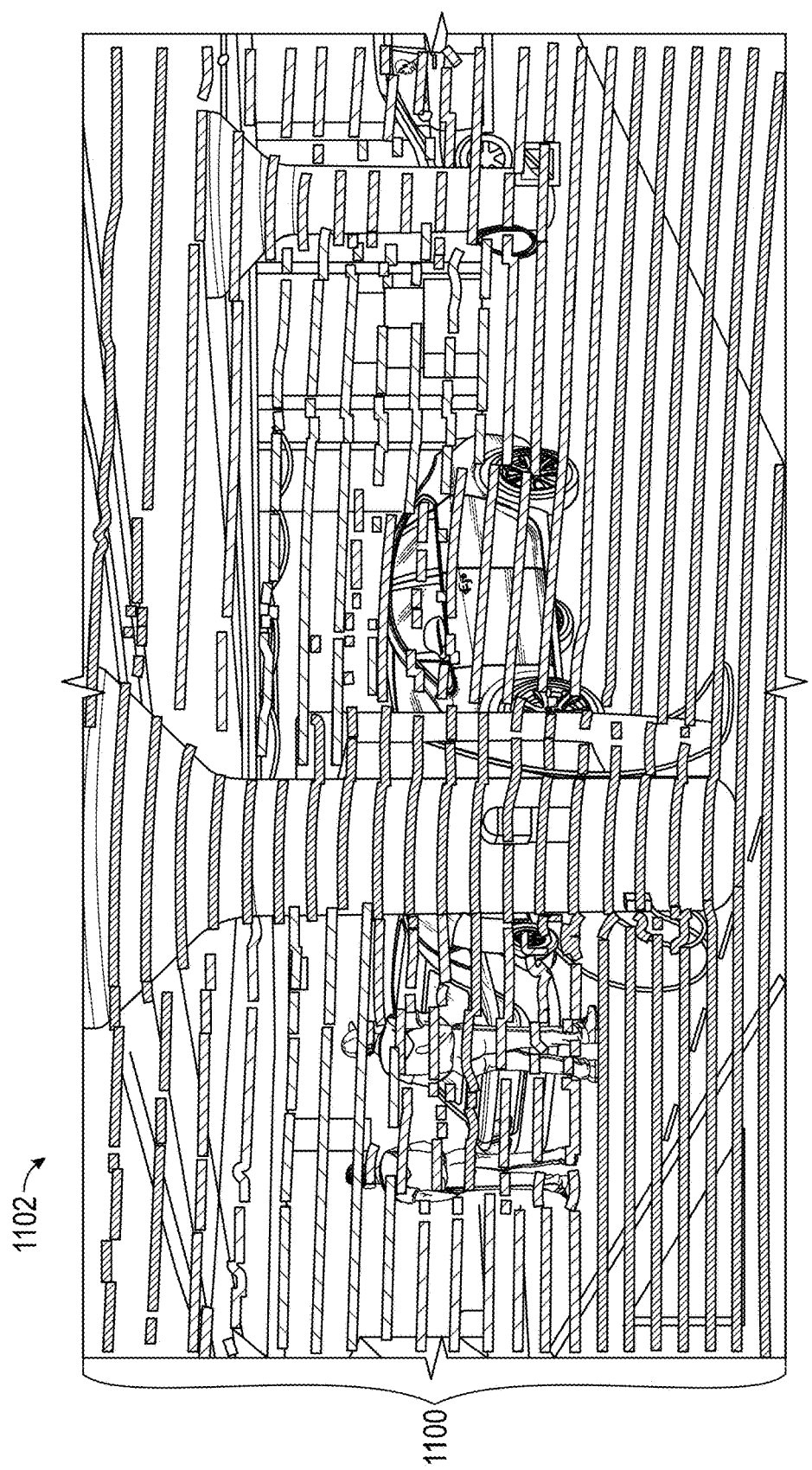
FIG. 11 depicts an exemplary image of an environment representative of a captured field of view of a camera onboard a vehicle and overlying ranging data from a ranging device calibrated with the camera in accordance with the calibration process of FIG. 10 in accordance with one or more exemplary embodiments.

FIG. 11 depicts a graphical representation of calibrated lidar scan data 1100 of an environment corresponding to a field of view of a camera overlaid on an image 1102 of the environment captured by the camera. By virtue of the calibrated transformation parameters, the lidar scan data 1100 can be transformed to pixel locations so that depth discontinuities along rows corresponding to the horizontal reference plane of the lidar device 504 are more closely aligned with corresponding features or elements in the image 1102. Accordingly, pixel locations may be correlated with lidar points and corresponding depths or distances may be assigned to those pixel locations with increased accuracy or precision by virtue of the calibration.

Referring again to FIG. 10, in one or more exemplary embodiments, the calibration process 1000 also stores or otherwise maintains the minimized transformation cost in association with the camera-lidar device pairing at 1010 to support verification or validation of the calibration as described in greater detail below in the context of FIG. 12. In this regard, the transformation cost may be analyzed or monitored periodically substantially in real-time during subsequent operation of the vehicle to detect or otherwise identify a potential loss of calibration or some other need for recalibrating or analyzing one or more of the onboard devices. For example, if it is subsequently determined that the transformation cost can be further minimized by a different combination of conversion parameter values, then the previously determined combination of conversion parameter values at 1006 no longer provides the minimum transformation cost, and therefore, may no longer reflect a calibrated relationship.

Referring now to FIG. 12, and with continued reference to FIGS. 1-5, a dataflow diagram illustrates various embodiments of a calibration verification process 1200 which may be embedded within a controller 34 in the control system 100 of FIG. 1 supporting the ADS 70 and image processing module 500 of FIG. 5 in accordance with the present disclosure. Again, the order of operation within the method is not limited to the sequential execution as illustrated in FIG. 12, but may be performed in one or more varying orders as applicable and in accordance with the present disclosure. Moreover, one or more of the tasks shown and described in the context of FIG. 12 could be omitted from a practical embodiment of the verification process 1200 while still achieving the generally intended overall functionality. In various embodiments, the verification process 1200 can be scheduled to run based on one or more predetermined events (e.g., whenever the vehicle 10, 400 exhibits a stationary condition satisfying calibration criteria), and/or can run periodically or continuously during operation of the autonomous vehicle 10, 400. For example, the verification process 1200 could be performed according to periodic time intervals (e.g., every 5 minutes), periodic distance intervals (e.g., every 5 miles travels), and/or the like.

The calibration verification process 1200 begins or otherwise initializes by obtaining an updated set of image data and lidar data from a paired camera 502 and lidar device 504 for which an existing calibration is to be analyzed at 1202. In exemplary embodiments, the calibration verification process 1200 invokes the data collection process 600 described above to obtain a correlated set of image and lidar data from the respective onboard devices 502, 504 while the vehicle 10, 400 is exhibiting a stationary condition that also satisfies applicable calibration criteria. Thus, the paired data sets used by the calibration verification process 1200 may be less susceptible to noise as described above and obtained during substantially similar vehicle conditions as those when the paired data sets used for the previous calibration where obtained.

The calibration verification process 1200 also obtains a reference minimum value for the transformation cost associated with the calibrated transformation parameter values associated with the camera-lidar pair being analyzed at 1202. In this regard, a control module 34, 500 may retrieve or otherwise obtain the stored minimum transformation cost value associated with the existing calibration of the paired camera 502 and lidar device 504 at 1010 from the data storage element 506. That said, in other embodiments, a reference transformation cost value may be calculated upon each iteration of the calibration verification process 1200. For example, reference transformation cost value may be calculated using the existing transformation parameter values, the previous paired data sets used for the existing calibration and the updated paired data sets being used for the verification so that the reference value accounts for the paired data set being used to verify the existing calibration.

In exemplary embodiments, the calibration verification process 1200 continues by varying or otherwise adjusting one or more of the transformation parameter values to minimize the transformation cost using the updated data set at 1206 and determining whether a transformation cost value that is less than the reference value can be achieved at 1208. In this regard, in a similar manner as described above at 1006, the control module 34, 500 minimizes the cost of transforming between camera and lidar reference frames across one or more paired data sets that includes the updated data set from 1202 by determining values for the conversion parameters that minimizes the overall cost in terms of the differences between a transformed location and the actual location of correlated non-horizontal edge features. When the control module 34, 500 minimized transformation cost value using the updated set is greater than or equal to the reference transformation cost value, the calibration verification process 1200 validates or otherwise verifies the existing calibration and exits.

When a transformation cost value that is less than the reference value can be achieved using the updated data set from 1202, the calibration verification process 1200 continues by comparing or otherwise analyzing the non-horizontal edge regions of the updated data set at 1210 to verify or otherwise confirm that neither of the paired devices is exhibiting an anomalous condition at 1212. In this regard, the calibration verification process 1200 distinguishes between a loss of calibration or other anomalous condition with respect to the previously determined calibrated transformation parameter values and an impairment or other anomalous condition with respect to one of the onboard devices 502, 504 that were previously calibrated with respect to one another.

In an exemplary embodiment, the control module 34, 500 detects or otherwise an anomalous condition when a non-horizontal edge region identified within the updated image data is not present in the lidar point cloud data, or conversely, when a depth discontinuity across a row of the lidar point cloud data does not have a corresponding non-horizontal edge region within the updated image data. In other words, calibration verification process 1200 may ensure that the same number of non-horizontal edges exist in both the updated image data and the lidar data and verify that each non-horizontal edge feature identified in one of the data sets has a corresponding non-horizontal edge feature in the other data set. When the non-horizontal edge regions of the updated image data match or otherwise correspond to the non-horizontal edge regions of the updated lidar data and vice versa, the calibration verification process 1200 identifies an absence of an anomalous condition or otherwise verifies the paired onboard devices 502, 504 are functioning properly.

After verifying an anomalous condition does not exist and the paired onboard devices 502, 504 are functioning properly, the calibration verification process 1200 continues with recalibrating the onboard devices 502, 504 at 1214 in a similar manner as described above. In one embodiment, the calibration verification process 1200 invokes or otherwise performs the calibration process 1000 to identify or otherwise determine updated calibrated transformation parameter values that minimizes the cost of transforming between camera and lidar reference frames cumulatively across the paired data sets utilized for the previous calibration and the updated data set. In some embodiments, the calibration verification process 1200 may updated the stored transformation parameter values by storing the transformation parameter values resulting in the minimum transformation cost at 1206 in the data storage element 506 in lieu of the previous transformation parameter values. In other embodiments, the calibration verification process 1200 may invoke or otherwise perform the data collection process 600 to obtain additional new or updated paired data sets, which may then be utilized for recalibrating the relationship between the onboard devices 502, 504 by invoking or performing the calibration process 1000 using such subsequently-obtained paired data sets. By virtue of verifying the onboard devices 502, 504 are functioning properly prior to recalibrating the relationship, the calibration verification process 1200 ensures the updated transformation parameter values are likely to be more accurate or more reliable than the preceding transformation parameter values.

When the non-horizontal edge regions of the updated image data do not match the non-horizontal edge regions of the updated lidar data or the non-horizontal edge regions of the updated image data and the non-horizontal edge regions of the updated lidar data otherwise lack correspondence across data sets, the calibration verification process 1200 initiates or otherwise performs one or more remedial actions with respect to the device exhibiting the anomalous condition at 1216. In this regard, in exemplary embodiments, the control module 34, 500 detects or otherwise identifies an absence of a non-horizontal edge in one of the sets of data that indicates the respective source device 502, 504 for that data is exhibiting an anomalous condition. For example, when one or more non-horizontal edges having a depth discontinuity greater than a threshold amount are identified within the updated lidar data and but corresponding non-horizontal edge regions are absent from the updated image data, the control module 34, 500 may determine that the camera 502 is exhibiting an anomalous condition. Conversely, the control module 34, 500 may determine that the lidar device 504 is exhibiting an anomalous condition based on one or more non-horizontal edges identified within the updated image data being absent from the updated lidar data.

In practice, the control module 34, 500 may utilize the relationships with other instance of onboard devices 502, 504 to ensure which of the onboard devices 502, 504 is functioning normally and which may be exhibiting an anomalous condition. For example, when multiple cameras 502 are paired with an individual lidar device 504, when one or more non-horizontal edges identified within the updated image data from one camera 502 are absent from the updated lidar data corresponding to that camera's field of view and one or more non-horizontal edges identified within the updated image data from another camera 502 are also absent from the updated lidar data corresponding to that camera's field of view, the control module 34, 500 may determine that the lidar device 504 is exhibiting an anomalous condition. Similarly, prior to determining a camera 502 is exhibiting an anomalous condition, the control module 34, 500 may utilize updated image data from another camera 502 and lidar data correspondences with the non-horizontal edges in that updated image data to confirm that the lidar device 504 is not exhibiting an anomalous condition.

In one or more embodiments, the remedial action initiated by the calibration verification process 1200 involves temporarily suspending use of the device 502, 504 exhibiting the anomalous condition. For example, when a lidar device 404, 504 is exhibiting an anomalous condition, the control module 34, 500 may disable or otherwise suspend usage of the ranging data output from that lidar device 404, 504 and utilize the ranging data output by another instance of the lidar device 404, 504 onboard the vehicle. Conversely, when a camera 402, 502 is exhibiting an anomalous condition, the control module 34, 500 may temporarily cease using image data from that camera 402, 502 for purposes of object classification or the like.

The remedial action initiated by the calibration verification process 1200 may also include or incorporate one or more user notifications. For example, in one embodiment, the control module 34, 500 may activate or otherwise illuminate one or more lights, indicators, or other elements on a dashboard of the vehicle 10, 400, to thereby notify a vehicle occupant of the anomalous condition. In some embodiments, a dashboard indication may also identify which onboard device 40, 502, 504 is suspected of exhibiting an anomalous condition and may require inspection or maintenance. The control module 34, 500 may also log or otherwise store event information pertaining to the anomalous condition, which may include, for example, identification of the device exhibiting the anomalous condition, the vehicle pose at which the anomalous condition was detected, and other information characterizing the context or state of the vehicle 10, 400 when the anomalous condition occurred. In some embodiments, the control module 34, 500 transmits or otherwise provides indication of the device 40, 502, 504 exhibiting an anomalous condition to a remote device 48, 52, 54, which, in turn generates or otherwise provides a graphical indication of the device 40, 502, 504 exhibiting an anomalous condition.

In response to a notification of an anomalous condition, a user may inspect the device 40, 502, 504 suspected of exhibiting an anomalous condition and take action with respect to the device 40, 502, 504 to restore normal operations of the device 40, 502, 504. For example, a user may clean a lens or sensor of the device 40, 502, 504, remove potential obstructions with respect to the line of sight of the device 40, 502, 504, adjust a housing of the device 40, 502, 504, adjust the manner in which the device 40, 502, 504 is engaged with or arranged on the vehicle 10, 400, adjust electrical connections or communications interfaces between the device 40, 502, 504, and the like. In yet other embodiments, the user may replace the device 40, 502, 504 with a different instance of the device 40, 502, 504. Once the anomalous condition is addressed, the notification may be cleared, and in response, the control module 34, 500 may subsequently reinitialize the data collection process 600 and the calibration process 1000 and resume autonomous operations of the vehicle 10, 400 using the device 40, 502, 504 previously suspected of exhibiting an anomalous condition.

By virtue of the calibration verification process 1200 being able to identify which of the onboard devices 40, 502, 504 is suspected of exhibiting an anomalous condition, the downtime and other costs associated with any maintenance may be reduced and the efficiency of such maintenance may be similarly improved. For example, rather than requiring a user to access and/or inspect each of the multiple cameras 502 and ranging devices 504 that may be present onboard any given vehicle 10, 400, the maintenance may be initially focused on the particular device 40, 502, 504 suspected of exhibiting an anomalous condition. Additionally, by virtue of the calibration verification process 1200 distinguishing between the potential cause of the loss of calibration at 1212, the calibration verification process 1200 may help to ensure a pair of devices 40, 502, 504 are not recalibrated when one of the devices 40, 502, 504 is not functioning normally, thereby avoiding subsequent operation using a potentially anomalous device 40, 502, 504 and/or with potentially inaccurate transformation parameter values.

It will be appreciated that the subject matter described herein allows for a more expedient and more accurate calibration by isolating and correlating non-horizontal edges which are less susceptible to noise and other artifacts, thus, fewer sets of data (or data sets from a lesser number of different vehicle positions) may be required to achieve a desired accuracy of calibration. For example, a single pair of image and lidar data may be utilized to calibrate a camera-lidar pair when the number of non-horizontal edges identified within the environment is greater than a threshold amount (or alternatively, when the magnitude of the depth or distance variations at the non-horizontal edges is greater than a threshold amount for at least a threshold number of edges). Additionally, using vehicle odometry or pose information allows for real-time detection of when the vehicle is stationary to obtain updated sets of data, which are also less susceptible to noise by virtue of the vehicle being stationary. Multiple camera and lidar device pairs can also be calibrated (or recalibrated) or have their respective calibrations verified substantially concurrently in parallel using data sets collected while stationary. While the subject matter is described herein primarily in the context of calibrating a camera image to lidar point cloud data, the subject matter is not necessarily to cameras or lidar and could be used in the context of any other pair or combination of devices of different imaging or surveying types to calibrate relationships between data sets from different devices operating independently of one another.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method of controlling a vehicle, the method comprising:
    detecting, by a control module onboard the vehicle, a stationary condition of the vehicle based on output of a sensor system onboard the vehicle;
    in response to the stationary condition:
        obtaining, by the control module, a first image from an imaging device onboard the vehicle during the stationary condition; and
        obtaining, by the control module, a first set of ranging data corresponding to a field of view of the imaging device from a ranging device onboard the vehicle during the stationary condition;
    correlating, by the control module, first edge regions from the first image with second edge regions of the first set of ranging data;
    detecting an anomalous condition exists based on a relationship between the correlated first and second edge regions relative to a reference relationship associated with the one or more transformation parameter values; and
    in response to the anomalous condition, initiating one or more remedial actions with respect to the anomalous condition.

2. The method of claim 1, wherein:
    detecting the anomalous condition comprises determining the anomalous condition with respect to one of the imaging device and the ranging device exists based on the relationship between the first edge regions and the second edge regions when a minimum transformation cost associated with the correlation between the first edge regions and the second edge regions is greater than a reference transformation cost associated with the one or more transformation parameter values; and
    initiating the one or more remedial actions comprises initiating one or more remedial actions with respect to the one of the imaging device and the ranging device.

3. The method of claim 2, further comprising determining one or more updated transformation parameter values for transforming between the reference frame associated with the imaging device and the reference frame associated with the ranging device based at least in part on the relationship between the first edge regions and the second edge regions when correspondence exists between the first edge regions and the second edge regions.

4. The method of claim 2, wherein determining whether the anomalous condition exists comprises detecting an anomalous condition with respect to the ranging device when one or more of the first edge regions lack correspondence in the second edge regions.

5. The method of claim 2, wherein determining whether the anomalous condition exists comprises detecting an anomalous condition with respect to the imaging device when one or more of the second edge regions lacks correspondence in the first edge regions.

6. The method of claim 1, further comprising:
applying a filter to the first image to identify the first edge regions; and
identifying depth discontinuities along horizontal rows of the first set of ranging data to identify the second edge regions.

7. The method of claim 1, further comprising validating the one or more transformation parameter values when a minimum transformation cost associated with a correlation between the first edge regions and the second edge regions is greater than a reference transformation cost associated with the one or more transformation parameter values.

8. The method of claim 7, further comprising, in response to validating the one or more transformation parameter values:
assigning, by the control module, one or more attributes to the first image based at least in part on the first set of ranging data and the one or more transformation parameter values; and
autonomously operating one or more actuators onboard the vehicle in a manner that is influenced by the one or more attributes assigned to the first image.

9. A method of controlling a vehicle, the method comprising:
detecting, by a control module onboard the vehicle, a stationary condition of the vehicle based on output of a sensor system onboard the vehicle;
in response to the stationary condition:
obtaining, by the control module, an image from an imaging device onboard the vehicle during the stationary condition; and
obtaining, by the control module, a set of ranging data corresponding to a field of view of the imaging device from a ranging device onboard the vehicle during the stationary condition;
filtering, by the control module, horizontal edges from the image, resulting in a filtered image including non-horizontal edge regions;
identifying, by the control module, second non-horizontal edge regions in the set of ranging data;
determining, by the control module, a minimum transformation cost based on a relationship between the non-horizontal edge regions of the filtered image and the second non-horizontal edge regions in the set of ranging data; and
when the minimum transformation cost is greater than a reference transformation cost associated one or more calibrated transformation parameter values for transforming between a reference frame associated with the imaging device and a reference frame associated with the ranging device:
determining, by the control module, whether an anomalous condition exists with respect to one of the imaging device and the ranging device based on the relationship between the non-horizontal edge regions of the filtered image and the second non-horizontal edge regions in the set of ranging data; and
in response to the anomalous condition, initiating, by the control module, a remedial action with respect to the one of the imaging device and the ranging device.

10. The method of claim 9, further comprising in the absence of an anomalous condition when the minimum transformation cost is greater than the reference transformation cost:

determining, by the control module, one or more updated transformation parameter values for transforming between the reference frame associated with the imaging device and the reference frame associated with the ranging device based at least in part on the relationship between the non-horizontal edge regions of the filtered image and the second non-horizontal edge regions in the set of ranging data; and
thereafter, determining, by the control module, one or more commands for autonomously operating one or more actuators onboard the vehicle in a manner that is influenced by the one or more updated transformation parameter values.

11. A vehicle, comprising:
a first device onboard the vehicle providing first data;
a second device onboard the vehicle providing second data;
a data storage element onboard the vehicle maintaining one or more transformation parameter values associated with a pairing of the first device and the second device;
one or more sensors onboard the vehicle; and
a controller that, by a processor, detects a stationary condition based on output of the one or more sensors, obtains a first set of the first data from the first device during the stationary condition, filters regions from the first set resulting in a filtered set of the first data, obtains a second set of the second data during the stationary condition, detects an anomalous condition with respect to one of the first device and the second device based on the relationship between the filtered set of the first data and the second set of the second data, and initiates a remedial action with respect to the one of the first device and the second device.

12. The vehicle of claim 11, wherein the controller validates the one or more transformation parameter values based on a relationship between the filtered set of the first data and the second set of the second data.

13. The vehicle of claim 11, wherein the controller provides an indication of the anomalous condition.

14. The vehicle of claim 11, wherein the controller temporarily suspends usage of the one of the first device and the second device.

15. The vehicle of claim 11, wherein the controller identifies first non-horizontal edge regions of the filtered set of the first data, identifies second non-horizontal edge regions of the second set of the second data, compares the first non-horizontal edge regions and the second non-horizontal edge regions, and identifies the anomalous condition with respect to one of the first device and the second device based on the comparison.

16. The vehicle of claim 11, the data storage element maintaining a reference transformation cost value associated with the one or more transformation parameter values wherein the controller validates the one or more transformation parameter values when a minimum transformation cost associated with the relationship between the filtered set of the first data and the second set of the second data is greater than the reference transformation cost value.

17. The vehicle of claim 16, wherein when the minimum transformation cost is less than the reference transformation cost value, the controller compares first non-horizontal edge regions of the filtered set of the first data with second non-horizontal edge regions of the second set of the second data and initiates recalibration when the first non-horizontal edge regions and the second non-horizontal edge regions match.

18. The vehicle of claim 17, when a difference exists between the first non-horizontal edge regions and the second non-horizontal edge regions, the controller identifies an anomalous condition with respect to one of the first device and the second device based on the difference, and initiates a remedial action with respect to the one of the first device and the second device.

19. The vehicle of claim 17, wherein the controller recalibrates the pairing based on a relationship between the first non-horizontal edge regions and the second non-horizontal edge regions.

20. The vehicle of claim 11, wherein the first device comprises a camera and the second device comprises a ranging device.

\* \* \* \* \*